(12) United States Patent
Hunn et al.

(10) Patent No.: US 12,437,352 B2
(45) Date of Patent: *Oct. 7, 2025

(54) SYSTEM AND METHOD FOR A COMPUTING ENVIRONMENT FOR VERIFIABLE EXECUTION OF DATA-DRIVEN CONTRACTS

(71) Applicant: DocuSign, Inc., San Francisco, CA (US)

(72) Inventors: Peter Geoffrey Lerato Hunn, Irving, CA (US); Ilya Ostrovskiy, Brooklyn, NY (US); Jerome Simeon, New York, NY (US)

(73) Assignee: Docusign, Inc., San Francisco, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/095,435

(22) Filed: Jan. 10, 2023

(65) Prior Publication Data

US 2023/0162304 A1     May 25, 2023

Related U.S. Application Data

(63) Continuation of application No. 16/164,501, filed on Oct. 18, 2018, now Pat. No. 11,568,505.

(Continued)

(51) Int. Cl.
*G06Q 50/18* (2012.01)
(52) U.S. Cl.
CPC ................ *G06Q 50/188* (2013.01)
(58) Field of Classification Search
CPC ...... G06Q 50/188; G06Q 50/18; G06Q 50/10; G06Q 20/405
See application file for complete search history.

(56) References Cited

U.S. PATENT DOCUMENTS

| 5,892,900 | A | 4/1999 | Ginter et al. |
| 6,640,304 | B2 | 10/2003 | Ginter et al. |

(Continued)

OTHER PUBLICATIONS

Grigg, "The Ricardian Contract", Proceedings First IEEE International Workshop on Electronic Contracting, IEEE, Jul. 6, 2004, pp. 25-31, URL: https://citeseerx.ist.psu.edu/document?repid=rep1&type=pdf&doi=d39728748553bf38d1907dfb41224f8127dbf246.

(Continued)

*Primary Examiner* — Miranda Le
(74) *Attorney, Agent, or Firm* — Shumaker & Sieffert, P.A.

(57) ABSTRACT

A system and method for establishing a verified computing environment for executing data-driven contracts, comprising a cryptographic directed acyclic graph object model of a data-driven contract, wherein at least a subset of the objects in the MDAG correspond to clause state of at least one programmable clause of the data-driven contract; at a computing environment, administrating the data-driven contract in accordance with the MDAG which can include at least one execution instance comprised of: receiving a contract input to contract logic of the data-driven contract, processing the input according to the clause logic, in response to the contract input, generating at least one updated state object and generating at least one output object, and for each generated object, hash-linking the generated object to an object associated with the creation of the generated object.

19 Claims, 20 Drawing Sheets

Related U.S. Application Data

(60) Provisional application No. 62/574,099, filed on Oct. 18, 2017, provisional application No. 62/631,375, filed on Feb. 15, 2018.

(56) References Cited

U.S. PATENT DOCUMENTS

| | | | |
|---|---|---|---|
| 7,756,772 B1 | 7/2010 | Konopnicki et al. | |
| 7,831,573 B2 | 11/2010 | Lillibridge et al. | |
| 8,086,866 B2 | 12/2011 | Jakobsson | |
| 8,285,681 B2 | 10/2012 | Prahlad et al. | |
| 8,719,576 B2 | 5/2014 | Buldas et al. | |
| 9,356,965 B2 | 5/2016 | Kjeldaas | |
| 9,432,192 B1 | 8/2016 | Pogde et al. | |
| 9,483,455 B1 | 11/2016 | Bastide et al. | |
| 9,608,829 B2 | 3/2017 | Spanos et al. | |
| 10,529,041 B2* | 1/2020 | Brown | G06Q 50/18 |
| 10,587,628 B2* | 3/2020 | Setty | H04L 67/10 |
| 10,643,288 B2* | 5/2020 | Orsini | G06F 21/78 |
| 11,568,505 B2 | 1/2023 | Hunn et al. | |
| 2002/0091539 A1 | 7/2002 | Yin et al. | |
| 2002/0184504 A1 | 12/2002 | Hughes | |
| 2007/0250337 A1 | 10/2007 | Karamchedu et al. | |
| 2009/0234662 A1 | 9/2009 | Stieber et al. | |
| 2010/0268528 A1 | 10/2010 | Raskina et al. | |
| 2011/0307278 A1 | 12/2011 | Clarke et al. | |
| 2012/0303969 A1 | 11/2012 | Jakobsson | |
| 2014/0164255 A1 | 6/2014 | Daly et al. | |
| 2015/0379510 A1 | 12/2015 | Smith | |
| 2016/0026620 A1 | 1/2016 | Gidney | |
| 2016/0028552 A1 | 1/2016 | Spanos et al. | |
| 2016/0034519 A1 | 2/2016 | Besch et al. | |
| 2016/0098723 A1 | 4/2016 | Feeney | |
| 2016/0110261 A1 | 4/2016 | Parab et al. | |
| 2016/0117471 A1 | 4/2016 | Belt et al. | |
| 2016/0283941 A1 | 9/2016 | Andrade | |
| 2016/0292672 A1 | 10/2016 | Fay et al. | |
| 2016/0330034 A1 | 11/2016 | Back et al. | |
| 2017/0103167 A1 | 4/2017 | Shah | |
| 2017/0103468 A1 | 4/2017 | Orsini et al. | |
| 2017/0177898 A1 | 6/2017 | Dillenberger | |
| 2017/0220815 A1 | 8/2017 | Ansari et al. | |
| 2017/0228731 A1* | 8/2017 | Sheng | G06Q 20/36 |
| 2017/0236120 A1 | 8/2017 | Herlihy et al. | |
| 2017/0243193 A1 | 8/2017 | Manian et al. | |
| 2017/0243286 A1* | 8/2017 | Castinado | H04L 9/3239 |
| 2017/0287090 A1 | 10/2017 | Hunn et al. | |
| 2017/0289111 A1 | 10/2017 | Voell et al. | |
| 2017/0331896 A1 | 11/2017 | Holloway et al. | |
| 2017/0352116 A1* | 12/2017 | Pierce | H04L 65/613 |
| 2017/0364701 A1* | 12/2017 | Struttmann | G06F 21/6218 |
| 2017/0366516 A1 | 12/2017 | Pattanaik et al. | |
| 2018/0005186 A1 | 1/2018 | Hunn | |
| 2018/0174255 A1 | 6/2018 | Hunn et al. | |
| 2018/0315141 A1 | 11/2018 | Hunn et al. | |
| 2018/0330343 A1* | 11/2018 | Gray | G06Q 20/3829 |
| 2018/0365201 A1 | 12/2018 | Hunn et al. | |
| 2019/0080392 A1 | 3/2019 | Youb et al. | |
| 2019/0358515 A1 | 11/2019 | Tran et al. | |
| 2020/0057994 A1 | 2/2020 | Hunn | |
| 2020/0193432 A1 | 6/2020 | Millar et al. | |

OTHER PUBLICATIONS

White, "How Computers Work", Que Publishing, Oct. 15, 2003, 4 pp.

Prosecution History from U.S. Appl. No. 16/164,501, now issued U.S. Pat. No. 11,568,505, dated May 29, 2020 through Sep. 22, 2022, 95 pp.

* cited by examiner

```
// the use of the "call" keyword means that the specified clause/function pair shall be called with
// the specified parameters and the clause state used shall be determined and accordingly updated
within
// the master state's state tracking facility.

clause _master {
  // note that this may be implemented as an event dispatch matrix intrinsic to the VM
implementation
  function main(_input) {
    switch(_input.type) {
      case "delivery":
        call delivery.on_delivery_event(_input)
        call payment.on_delivery_event(_input)
      case "atmosphere":
        call conditions.on_atmosphere_event(_input)
      default:
        trigger_consensus_failure_due_to_invalid_input
    }
  }
} clause payment {
  function add_demerits(number_of_demerits) {
    _state.accrued_demerits += number_of_demerits
    if _state.accrued_demerits > state.max_demerits {
      _state.accrued_demerits = state.max_demerits
    }
  } function on_delivery_event(_input) {
    var price_to_pay = _state.agreed_price
    foreach demerit in (1 to _state.accrued_demerits) {
      price_to_pay -= (0.01 * _state.agreed_price)
    }
    // VM intrinsic function bdl_payment(bdl_name, from, to, value)
    bdl_payment("CoinChain", _state.purchaser_address, _state.supplier_address, price_to_pay)
  }
} clause conditions {
  function on_atmosphere_event(_input) {
    if(_input.timestamp < _state.next_usable_timestamp) {
      // ignore the input and do nothing, or do some other logic
      // for an "invalid" atmospheric conditions event
    } else {
      _state.next_usable_timestamp = _input.timestamp + 10 minutes;
      if(_input.temp_c < _state.min_temp_c or _input.temp_c > _state.max_temp_c) {
        call payment.add_demerits(1);
      }
      if _input.humidity_p <= _state.min_humidity_p or _input.humidity_p > _state.max_humidity_p {
        call payment.add_demerits(1);
      }
    }
  }
} clause delivery {
  function on_delivery_event(_input) {
    if (_input.timestamp > _state.late_delivery_cutoff) {
      call payment.add_demerits(10)
    }
  }
}
```

FIGURE 7

Sample Clause Instance

```
{   "$class": "org.clause.latedeliveryandpenalty.LateDeliveryAndPenaltyContract",
    "contractId": "25a326b9-e396-4e8d-ac90-d64c2d1775c3",
    "buyer": {
        "$class": "org.clause.cicero.contract.Party",
        "partyId": "Steve"
    },
    "seller": {
        "$class": "org.clause.cicero.contract.Party",
        "partyId": "Dan"
    },
    "forceMajeure": true,
    "penaltyDuration": {
        "$class": "org.clause.time.Duration",
        "amount": 2,
        "unit": "days"
    },
    "penaltyPercentage": 10.5,
    "capPercentage": 55,
    "termination": {
        "$class": "org.clause.time.Duration",
        "amount": 15,
        "unit": "days"
    },
    "fractionalPart": "days"
}
```

Sample Side Effect Event

```
{   "$class": "org.clause.cicero.runtime.PaymentObligation",
    "amount": {
        "$class": "org.clause.money.MonetaryAmount",
        "doubleValue": 10,
        "currencyCode": "GBP"
    },
    "description": "Aliquip aute.",
    "contract": "resource:org.clause.latedeliveryandpenalty.LateDeliveryAndPenaltyContract#4893",
    "promisor": "resource:org.clause.cicero.contract.Party#4108",
    "promisee": "resource:org.clause.cicero.contract.Party#5646",
    "deadline": "2018-10-04T16:00:31.915Z",
    "eventId": "9f0997b1-c7ee-11e8-a857-effbe0f583e8",
    "timestamp": "2018-10-04T16:00:31.915Z"
}
```

Sample State

```
{
    "$class": "org.clause.cicero.contract.ContractState",
    "stateId": "9f0997b0-c7ee-11e8-a857-effbe0f583e8"
}
```

Sample Request

```
{
    "$class": "org.clause.latedeliveryandpenalty.LateDeliveryAndPenaltyRequest",
    "forceMajeure": false,
    "agreedDelivery": "2018-10-04T16:00:31.913Z",
    "deliveredAt": "2018-10-04T16:00:31.913Z",
    "goodsValue": 169.309,
    "transactionId": "9f094990-c7ee-11e8-a857-effbe0f583e8",
    "timestamp": "2018-10-04T16:00:31.913Z"
}
```

Sample Response

```
{
    "$class": "org.clause.latedeliveryandpenalty.LateDeliveryAndPenaltyResponse",
    "penalty": 24.54,
    "buyerMayTerminate": true,
    "transactionId": "9f0970a0-c7ee-11e8-a857-effbe0f583e8",
    "timestamp": "2018-10-04T16:00:31.914Z"
}
```

FIGURE 17

```
/* Defines the data model for a LateDeliveryAndPenalty
template. This defines the structure of the abstract
syntax tree that the parser for the template must
generate from input source text. */

@Template("latedeliveryandpenalty") concept TemplateModel
{
/* Does the clause include a force majeure provision? *
Boolean forceMajeure /* For every penaltyDuration that the goods are late */
Duration penaltyDuration /* Seller pays the buyer penaltyPercentage % of the value
of the goods */
Double penaltyPercentage /* Up to capPercentage % of the value of the goods */
Double capPercentage /* If the goods are >= termination late then the buyer
may terminate the contract */
Duration termination
}
```

FIGURE 19

SYSTEM AND METHOD FOR A COMPUTING ENVIRONMENT FOR VERIFIABLE EXECUTION OF DATA-DRIVEN CONTRACTS

CROSS-REFERENCE TO RELATED APPLICATIONS

This application is a continuation of U.S. application Ser. No. 16/164,501, filed Oct. 18, 2018, which claims the benefit of Provisional Application No. 62/574,099 filed on Oct. 18, 2017, and Provisional Application No. 62/631,375 filed on Feb. 15, 2018, all of which are incorporated in their entireties by this reference.

TECHNICAL FIELD

This invention relates generally to the field of computing, and more specifically to a new and useful system and method for executing data-driven contracts such as legal contracts.

BACKGROUND

In recent years there has been growing interest in blockchain and distributed ledger technologies. Distributed ledgers (also known as "shared ledgers", "replicated ledgers" or, in specific implementations, "blockchains"), are a type of database architecture where a single record of data is spread throughout and viewable by numerous entities, and typically updated according to a robust consensus protocol/algorithm. Despite the promise and benefits of these technologies, there are significant technical impediments to the generalized usage of 'on-chain' transactions and particularly so-called "smart contracts".

"Smart contract" systems execute computational logic as a transaction-based state machine in a distributed environment in which all nodes of a distributed ledger or blockchain network process all transactions and enforce state changes on-chain automatically in step with contract logic execution using built-in consensus mechanisms. Each time a "smart contract" is executed, the state of the ledger is updated with output of the computation. Combining execution and consensus-based enforcement is typically suitable for cryptocurrency applications where it is desirable for an enforced transfer of a digital asset to be performed together with the act of computing the transfer. However, this paradigm of bundled execution and consensus-based enforcement is unsuitable for a large number of potential applications that may not require enforcement with execution or that are inhibited by contemporaneous enforcement and execution.

Computable legal contracts are an important use case for distributed ledger and blockchain systems, and represent one such example. By contrast with generalized "smart contracts", commercial legal contracts are, firstly, inherently private conceptions and often necessitate contract data, state, and computation is at least partially private. Secondly, computable legal contracts, as distinct from generalized "smart contracts", require verifiable computation, but may often be hindered by automated enforcement. For example, automated enforcement may not be commercially or legally exigent, such as where a contracting party does not wish to avail themselves of certain rights under an agreement, or where an error in execution gives rise to the need for legal rectification (e.g., restitution), or where a dispute resolution mechanism prior to enforcement is preferable or required. Existing "smart contract" systems that combine execution and enforcement of the effects of execution may not, therefore, be suitable for commercial and legal application. Thirdly, computable legal contracts frequently need to natively integrate with computing environments other than blockchains and distributed ledgers. None of these attributes are suitably provided for in existing "smart contract" computing systems.

Providing suitable computing environments is critical to the adoption of the technology for enterprise and legal application. Thus, there is a need in the computing field to create a new and useful system and method for a verifiable, deterministic, and consensus-based computing environment. This invention provides such a new and useful system and method.

BRIEF DESCRIPTION OF THE FIGURES

The present invention is illustrated by way of example, and not by way of limitation, in the figures of the accompanying drawings in which:

FIG. 7 is a pseudocode example of executable logic for a supply contract;

FIG. 17 is a representation of an exemplary data-driven contract of a preferred embodiment comprising programmable clause instance, state, request, response, and side effect objects;

FIG. 19 is an exemplary data model for an exemplary programmable clause template.

DESCRIPTION OF THE EMBODIMENTS

Figure 1:
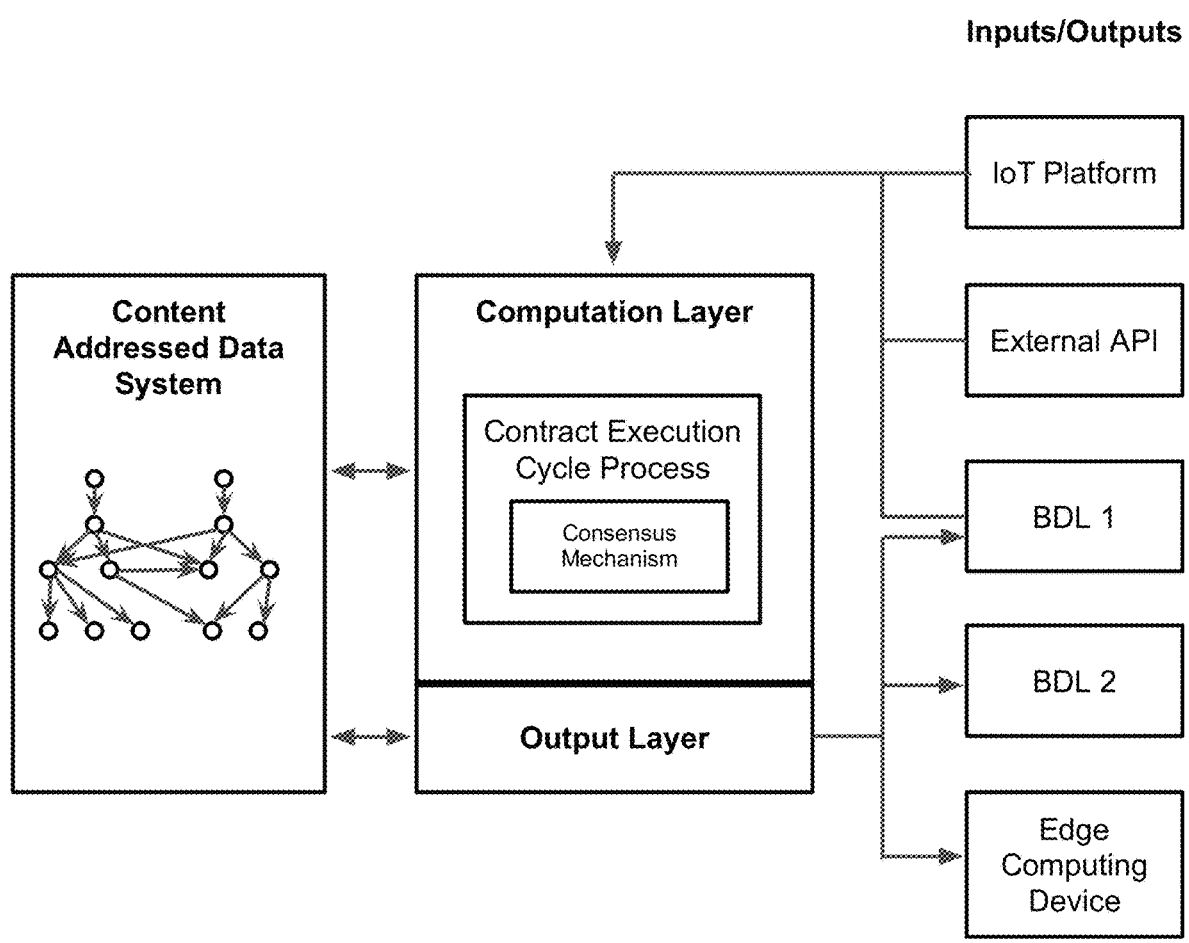
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for a cryptographically verifiable and deterministic computing environment of a preferred embodiment functions to enable logic execution backed by a mechanism supporting verification and consensus by multiple parties. The system and method preferably utilizes a content-addressable data system in combination with a computing environment that ensures actions by the computing environment can be deterministic, reproduced, and verified.

The system and method may have a variety of applications. The system and method have particular applicability as a computing environment, more specifically a virtual machine (VM), or any suitable execution engine that can operate on content-addressed Merkle objects. One particular application is the use as a computation environment for blockchain/distributed ledger based networks/applications and so called "smart contract" systems. Such "smart contracts" may be executed in a centralized, decentralized, or distributed environment, or other appropriate approach. Equally, the system and method may be used in implementations without a blockchain/distributed ledger system component.

The system and method operates by acting upon data input objects exposed to the logic of a data-driven contract to create verifiable state transitions by hash-linking states of the data-driven contract computation together. The computation output may then be used in a variety of external resources, such as blockchains and distributed ledger (BDL) systems. Importantly, this approach means that the computation is verifiable, but the computing environment is not tied to a BDL system. As such, data-driven contracts can run off-chain. This is particularly useful and applicable to legal agreements that not do require or desire global state consensus and enforcement by a BDL system at every state transition or by non-contracting parties/nodes, but benefit from verifiable and immutable computation and the ability to use BDLs where appropriate (e.g. for asset transfers pertaining to a legal contract), as well as to natively integrate with other external resources such as web services, software applications and systems, and edge computing devices The system and method can be implemented in a variety of types of computing architecture. The computing environment in one variation is implemented through a VM though any suitable execution engine elements may additionally or alternatively be used. Preferably, the system and method can be implemented as a configured VM that can run on one or more computing hosts for different parties, such as peers within a peer-to-peer network. The VM can be stack based, register based, a business rules engine, a program interpreter, or any other suitable type of VM. In some sense, the system and method may be implemented through a distributed peer-to-peer system, such as a point-to-point messaging system, as part of a node on a BDL network, overlay network, or other appropriate mechanism. Peers may be contracting parties with some interest or involvement in the contract execution, other parties, other computing systems, and/or any suitable entity that participates in the collaborative execution of the system and method. In other embodiments, the system and method may be implemented locally, within a private computing system, or other suitable computing architecture, such as a cloud-based environment (e.g., as part of a SaaS offering).

The system and method may additionally handle a variety of input types such as data input accessed over a programmatic interface (e.g., a REST API, GraphQL API, SOAP API, etc.), simple mathematical transformations of the data from those APIs, event notifications, data from various blockchain/distributed ledger systems, data from the execution of the data-driven contract, off-chain or on-chain, and/or other various sources.

As one potential benefit, the system and method enables the execution of data-driven contracts in a way that is deterministic, verifiable, and auditable. The input data, output data/actions, and logic are preferably managed by the system and method such that prior actions performed by the computing environment can be verified. The execution history can be stored in an immutable, non-repudiable manner, to enable such verification. The computing environment manages and uses a cryptographic append-only data structure to act as a verifiable record of computation. As the execution is deterministic, the same set of inputs results in the same set of outputs, the actions of the computing environment can be verified against the data inputs and logic of a contract executed using the system and method.

As another potential benefit, the system and method enables a computing environment that is usable for on-chain and/or off-chain related applications. In some instances the system and method may support the integration of off-chain systems with on-chain systems. Furthermore, the system and method can act as a computing environment capable of bridging distinct systems whether on-chain or off-chain. For example, by computation not being directly tied to a BDL system at a global level, the system and method may enable so called "smart" or data-driven legal contracts to be executed off-chain, whilst providing many of the benefits of on-chain execution without a number of the associated drawbacks (e.g. privacy of logic, computation, and state automated enforcement; network scalability and throughput), as well as integration with on-chain system components (e.g. on-chain "smart contract" code, a distributed ledger or similar data structure, etc.). Processing of a contract may, therefore, be uncoupled from a blockchain or distributed ledger system but run in a way that retains verifiability of state and computation. As such, the system and method may be more computationally efficient by selectively using BDL systems and suitable for use in commercially sensitive applications and applications where verifiable computation and enforcement need not, or should not, be contemporaneous. All validating nodes on a BDL system or other such network may, as is typically the case, not have to process every transaction as this occurs off-chain, and transaction or computation costs (e.g. 'gas') may be reduced as only the transactions/state that require global state are actually executed or broadcast on-chain (e.g. asset transfers, payments, state records, on-chain co-ordinated operations such as multi-signature operations, etc.). This is particularly suitable for legal contracts, where global state consensus is not necessarily required at the contract level, which is typically a matter between the contracting parties. For example, the computation, either in whole or in part, for a data-driven legal contract or "smart" contract may be computed off-chain and the output instantiated on-chain. On-chain instantiation may occur via an on-chain script in an on-chain library to instantiate, deploy, or effect an on-chain transaction/operation; in a field in an on-chain transaction (e.g. as an opcode, in a transaction data field, etc.); as an on-chain object/record (e.g. object graph data); by functioning as an off-chain 'oracle'; or any other suitable approach/mechanism.

In one particular usage scenario, a contract may be executed off-chain and data may then be passed to a BDL (e.g., to instantiate state on-chain, such as a master state record) or may call code that exists in an on-chain library (or otherwise) on a BDL to execute an operation such as an asset (e.g. token, cryptocurrency, etc.) transfer (see U.S. patent application Ser. No. 15/476,791). Data pushed to a BDL may include any arbitrary payload data, which may include (but is not limited to): object outputs from the execution environment, execution data, computation metadata (such as timestamps), parameters from the contract or from contract processing, and other data.

A further potential benefit is that the system and method may enable an end-to-end cryptographic computation cycle. The Merkle-linked/content addressed memory scheme may allow proof-based data inputs to be computed and the computed output used by the output layer, wherein it may be referenced in API calls, BDL records/transactions, and other transactions, systems, and resources. This may improve auditability and trust in the computation cycle.

Furthermore, changes in the state of the execution of a program such as a computable legal contract or programmable clause may be validated without the need to run the entire computation as the computing environment provides verifiable state change data between computations.

Figure 11:
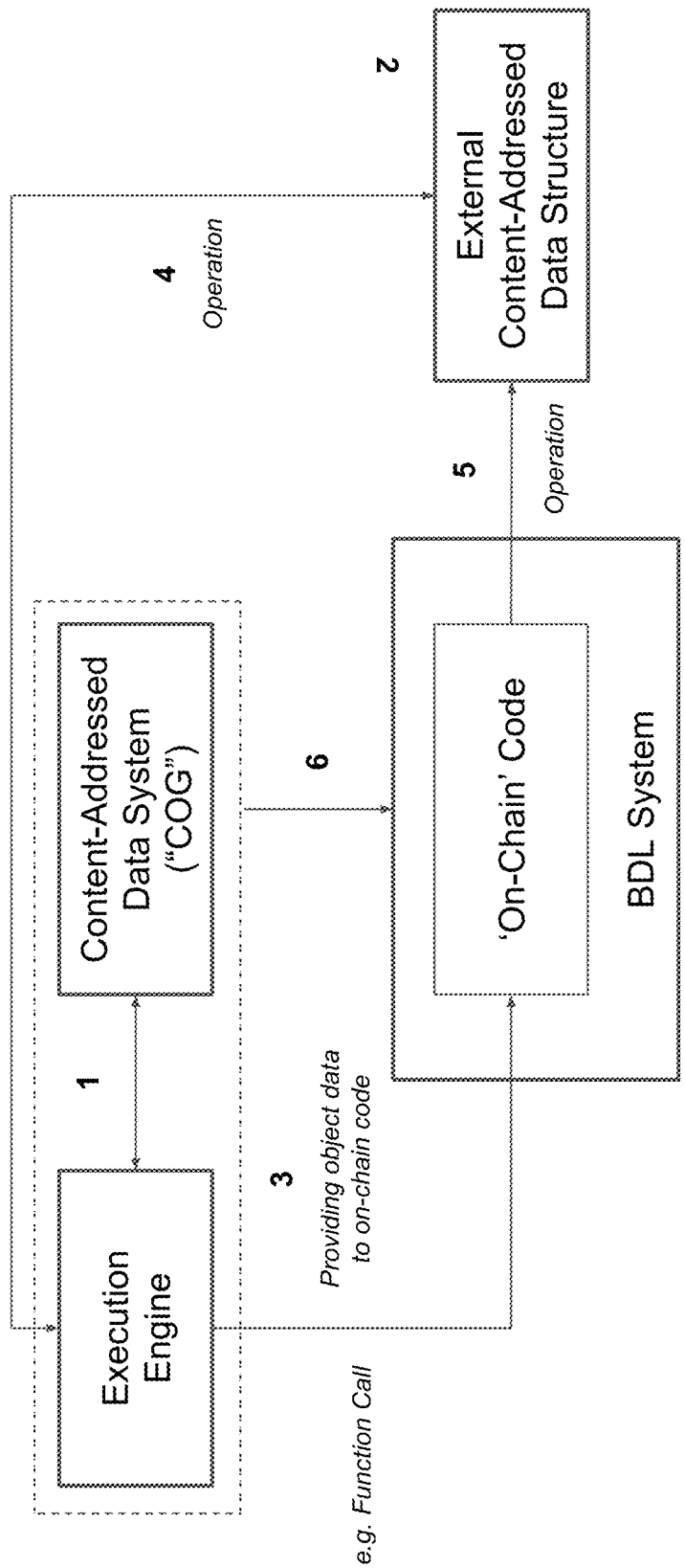
FIG. 11 is a schematic representation of the system and method depicting a variety of potential interfaces with external data structures.

The system and method also provides the potential benefit of providing a mechanism for cryptographic computation across systems. The system and method may interface natively with other content-addressed systems (e.g., version control systems such as Git and hypermedia protocols and distributed file systems such as InterPlanetary File System. In one example, the system may facilitate read/write operations or modification of data on other cryptographic data structures or systems. A contract may be executed using the system and method and the execution of that contract may modify the data structure on the external cryptographic resource, data structure, system, or similar. The external data structure may take any suitable form, including (but not limited to) another contract or clause in a contract; external code, adding or editing a file in a git repository, a file (such as media file) hosted on hypermedia systems, and many others. This has the potential benefit of enabling a contract to verifiably perform operations on, reference contract state, computation, and similar in external systems to extend the use of verifiable state across systems. Such attributes may be particularly beneficial to provide auditability between contract events and operations on such systems. As depicted in exemplary fashion by FIG. 11, the system and method may interface with external data structures in a variety of ways, including (but not limited to):

Executing an operation on an external data structure using the computing environment (4);

Interfacing with on-chain BDL code (2)—which may use COG data objects (3)—to perform function calls, and a variety of other interactions, that subsequently modify, update, appended or otherwise interact with the external data structure (5) (e.g., appending new objects to the data structure, modifying the data structure, etc.). The new state of the external data structure may then be used by the computing environment (4 and 1); and Instantiating an on-chain record of computation state (e.g. the content-address hash of the current state object, master state, series of state objects, a concatenated series of objects such as a master state object or hash thereof, or similar) (6).

As one example, a function in a programmable clause in a data-driven contract may, when executed, update the state of an on-chain "smart contract" that represents an intellectual property right over a file hosted on a hypermedia protocol (e.g. InterPlanetary File System or similar) such as where an IP assignment/transfer has occurred or a license terminated pursuant to the data-driven contract. Similarly, an external data structure may modify or update the state of a programmable clause by, for example, providing inputs to the computing environment. In one example, this may take the form of on-chain code that performs function executions in a manner that is an input to a data-driven contract executed using the system and method (e.g., using on-chain state as an input to an off-chain programmable clause). In another variation, the system and method may use objects from a DAG or data from any suitable data structure as an input (e.g. a transactional DAG used as a distributed ledger system, a hypermedia protocol, distributed file system etc.). The system and method may also output objects generated by computation to other data structures (e.g. an object may be output by the computing environment as part of a contract execution cycle and stored in another system to execute an operation on that system or to act as a record of a contract event).

In another example, the computation environment may be integrated with a multiplicity of blockchain/distributed ledger protocols and instances of each. For example, a data-driven contract executed using the system and method may integrate with two or more ledgers of the same or different protocols at the contract level. This is beneficial as various operations, transactions, and state may be needed to be performed or shared not solely on a single blockchain or distributed ledger (e.g., a tokenized asset transfer may be performed on a first chain/ledger, a payment performed on second chain/ledger, and state shared on a third chain/ledger). The system and method may be used with either a contract account, Unspent Transaction Output (UTXO), or other appropriate BDL model. In another example, content-addressed COG objects may be referenced in cryptocurrency transactions (e.g., in a Opcode field of a Bitcoin transaction).

The system and method can also enable other approaches to execution of data-driven, computable, or "smart contracts". The system and method may be run locally; in a shared computing environment such as public, dedicated, or private cloud environment; on a shared server; on a peer-to-peer network; embedded in or form part of a client for running a node of a BDL network; or other appropriate execution environment. In certain applications, this may provide various scalability and privacy benefits over on-chain execution, as well as ancillary practical benefits such as enabling parties to easily calculate and share execution costs (e.g. using data usage-based pricing rather than use of 'gas'). A further potential benefit of the system and method is that it may facilitate other new and useful models/approaches to contract execution. For example, the system and method may enable a contract state to be computed with cryptographic proofs as an alternative approach of achieving so-called "layer 2" scaling functionality such as 'state channels' and 'layered chains' (e.g. 'Ethereum Plasma"); reducing the need for on-chain computation.

Despite the foregoing, the system and method could similarly be applied to contracts composed in an alternative manner, or other use cases where an application is composed of different functions or where any suitable programmable logic composition can reasonably be used in place of a contract. Thus, the system and method may be usable for any suitable application for cryptographic object based computation.

Glossary of Terms

Herein, "blockchain/distributed ledger" (BDL) is used to refer to distributed ledgers and/or other specific consensus-based blockchain solutions, wherein any suitable variation of such systems may be used. References to BDL systems, platforms, integrations, transactions and the like could be distributed ledger variations or blockchain variations. A BDL may be native to the system and method or may be an external integration.

Herein, "on-chain" and "off-chain" refer to implementations on and off public distributed ledgers.

As used herein, "data-driven contracts" are composed of one or more "programmable clauses" as well as "natural language clauses".

As used herein, a "programmable clause", or sometimes more specifically "clause logic", refers to computing logic within the data-driven contract.

As used herein, 'clause state' may be characterized as non-executable data which influences clause logic behavior based on its contents; the contents representing the current execution state of a clause.

As used herein, 'clause invocation' characterizes the execution of a function/logic in a programmable clause with a given set of parameters. Clause invocation functions to execute a programmable clause the set of parameters as input to the clause logic.

As used herein, a "master clause" is used to characterize the programmable clause that is invoked for a given input at the beginning of an evaluation cycle. More generally, the master clause can be the "main clause". A master clause may generally look at the input and determine which programmable clause to route the input to and invoke the appropriate functions. For certain inputs which are necessary to the operation of the computing environment, the master clause may not route these events, but instead update the master clause state using the information contained therein. A master clause may be a programmable clause intended to function as a legal clause or may be a programmable clause intended to be distinct from to the legal clauses in a contract (e.g., to perform an orchestration function).

As used herein, "master state" characterizes the clause state for a master clause. The master clause and master state are two constructs that are used in illustrating one potential implementation, but the system and method may be implemented in other potential approaches without the use of a master clause or state.

As used herein, an "event dispatch matrix" characterizes the configuration or data used to determine which clauses to invoke for a given input to a contract. As stated above, depending upon implementation of the contract, some embodiments may use alternative mechanisms for routing data to programmable clauses and orchestrating invocation in a contract.

2. System

Figure 6:
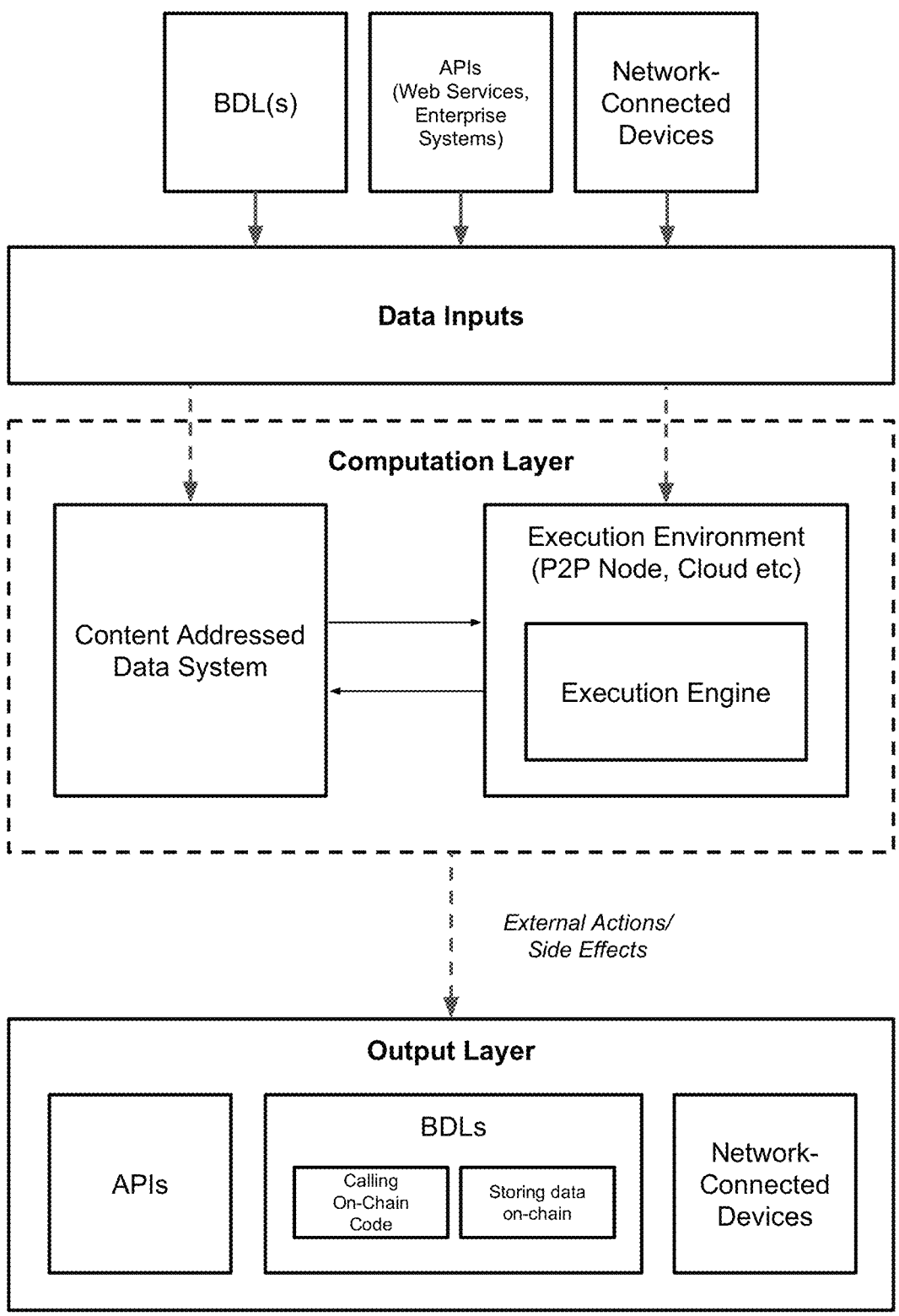
FIG. 6 is a high-level schematic representation of the system and method and other components.

As shown in FIG. 1, a system for a cryptographically verifiable and deterministic computing environment of a preferred embodiment may include a computing architecture with a computation layer and an output layer that facilitates execution and operates against a content-addressable data system using a consensus mechanism. FIG. 6 shows an alternate variation of the system. The system is preferably a "multi-layer" computing environment where the computation layer can facilitate evaluations of a programmable clause as data is received. The system is preferably implemented as a virtual machine (VM) but may alternatively be any suitable execution engine of the computing environment. The system is preferably implemented as a dual-layer system (e.g., computation layer and output layer) to facilitate managing evaluation of content-addressed data by the computation layer and verifiable interactions with other systems as directed by the output layer, such as interacting with external resources such as blockchains/distributed ledgers (BDLs), external REST APIs, and the like. The two layers may interact with each other indirectly, but preferably share a common contract state during interactions. The computing environment of the system in some instances operates as a specialized state machine that maintains the content-addressable data system used in accounting for execution processes.

Figure 12:
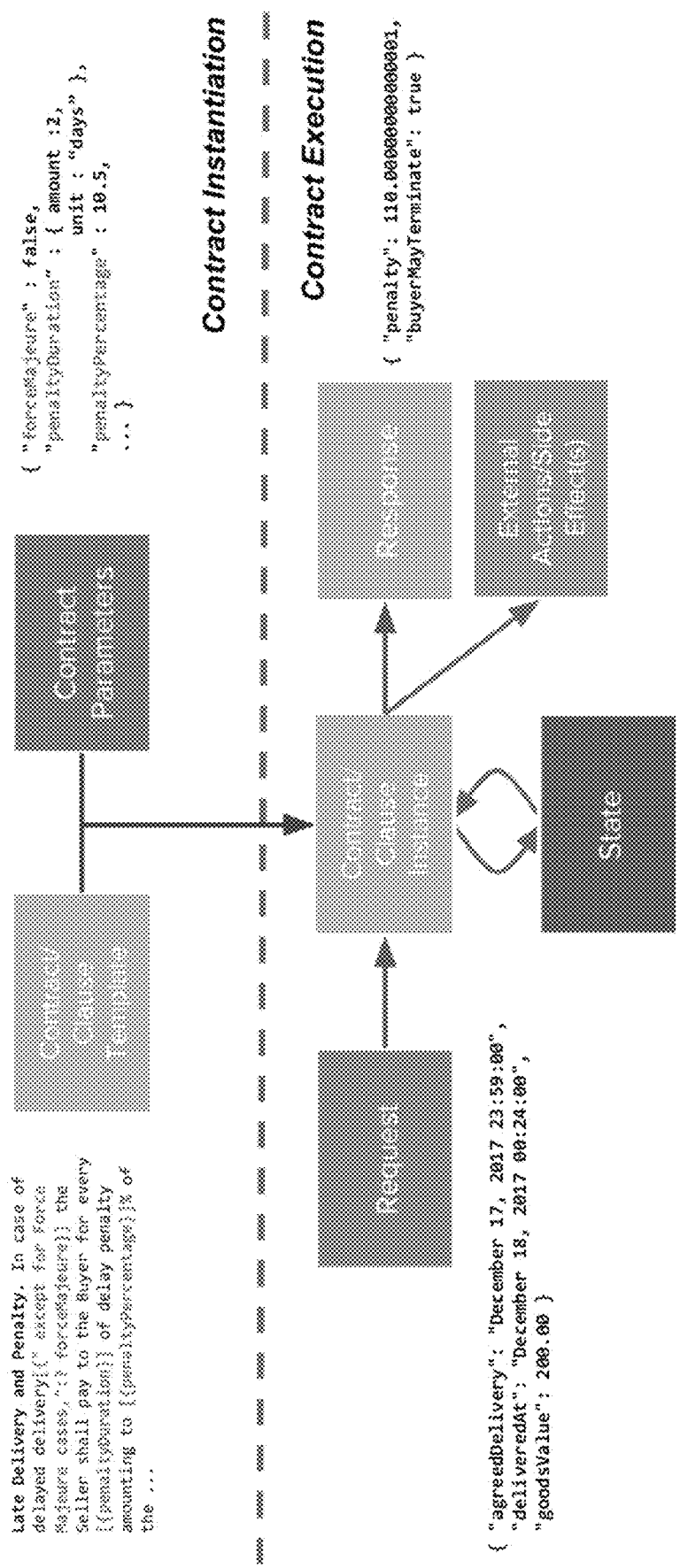
FIG. 12 is a schematic representation of a contract instance, request, execution, response, state, and side effect.
Figure 14:
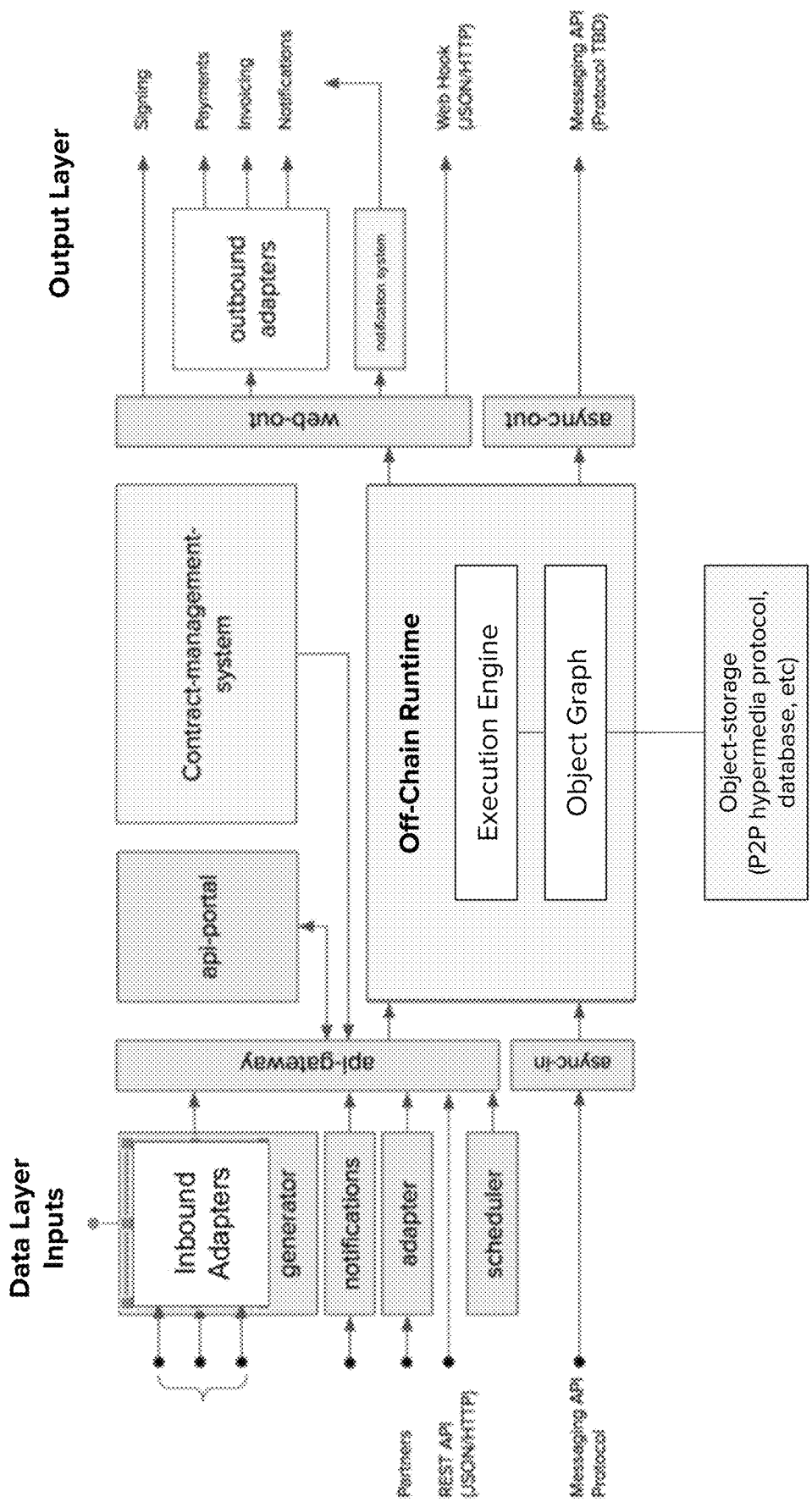
FIG. 14 is a schematic representation of the system and method and an exemplary resource input and output integration architecture.
Figure 15:
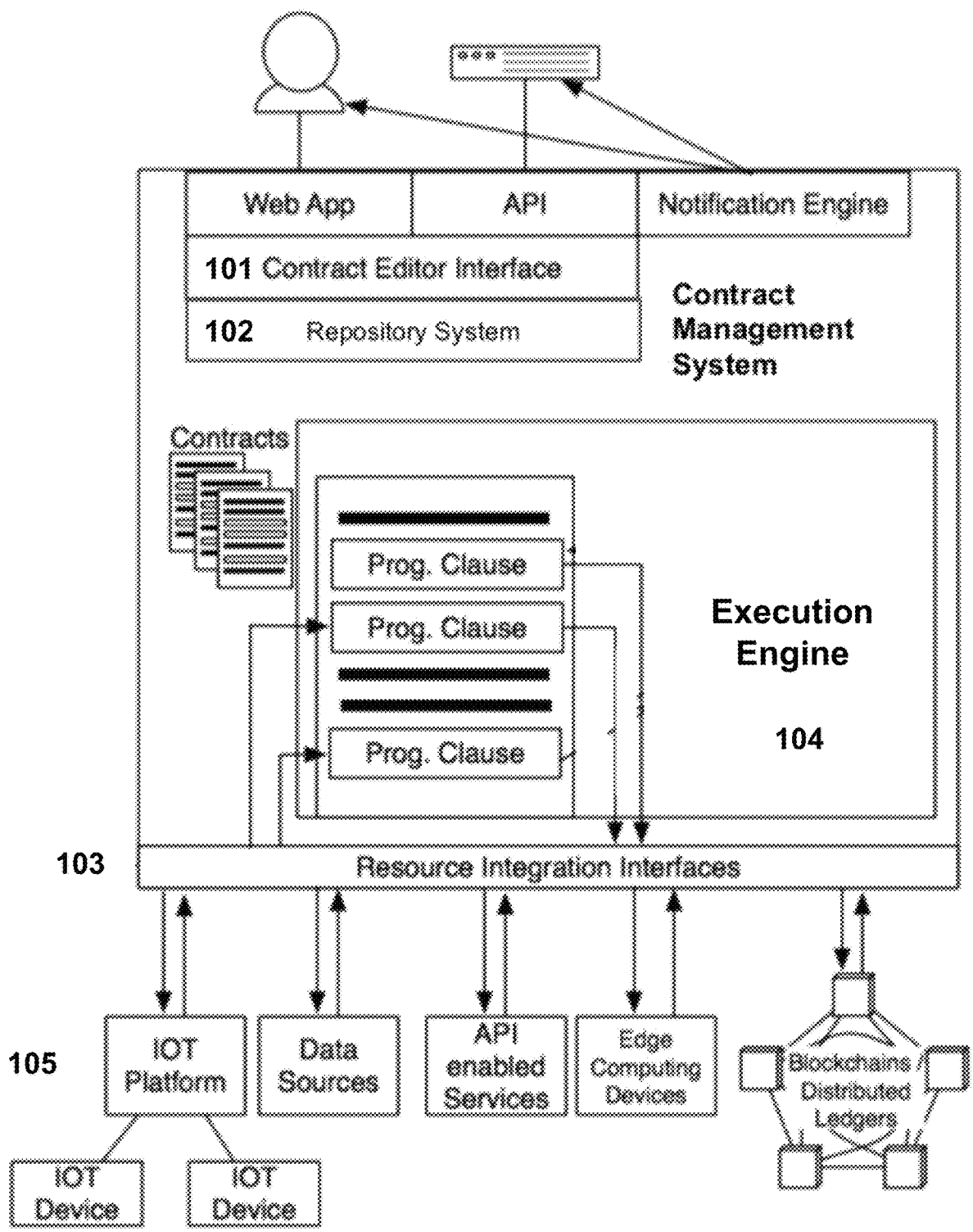
FIG. 15 is a schematic representation of an exemplary usage of the system and method.

In a preferred embodiment, the functional components of the system include (but are not limited to): data ingestion, a computing environment (e.g., a VM or any suitable execution engine), contract updates, and external actions or side effects. The data ingestion component functions to send data (transactions) into the system from external sources, poll external systems for data, pull data into the system, or otherwise acquire data. The computing environment functions to execute the logic of a contract against the contract state. The contract state may be a discrete entity (e.g. a master state object) or comprise an abstract aggregation of all clause states as shown in FIG. 17. The contract and the contract state may be stored in any suitable manner, but preferably in an immutable content-addressed storage system. In a preferred embodiment, a content-addressed storage system takes the form of a cryptographic content-addressed object graph, which itself is preferably stored in a backend object store or other appropriate storage mechanism. The contract, when executed, functions to update the state of the contract and the object graph. The execution can additionally request external actions ("side effects") as depicted in FIG. 12. External actions are preferably used to trigger actions on external systems (e.g., updating blockchain and distributed ledger systems, sending emails, updating accounting systems etc.) through resource integrations as depicted in FIG. 14 and FIG. 15. The external actions may utilize data emitted from execution of a clause, such as specific contract objects (such as obligations or responses as shown in FIG. 17), clause state, and similar.

Contract and Clause Logic

The system is preferably used in the execution of a contract composed of one or more programmable clauses. Programmable clauses, or more specifically the clause logic, may consist of one or more functions, which are comprised of one or more statements and simple flow control (if-then-else, bounded loops). Various approaches may be used in defining or designing a contract and its clauses.

A data-driven contract for use with the system and may take any suitable form. In one embodiment, a contract may be expressed solely as executable logic scripts, as depicted in FIG. 7 (and subsequently used in FIGS. 4, 8, 9A and 9B). Natural language may be included in inline comments.

Figure 13:
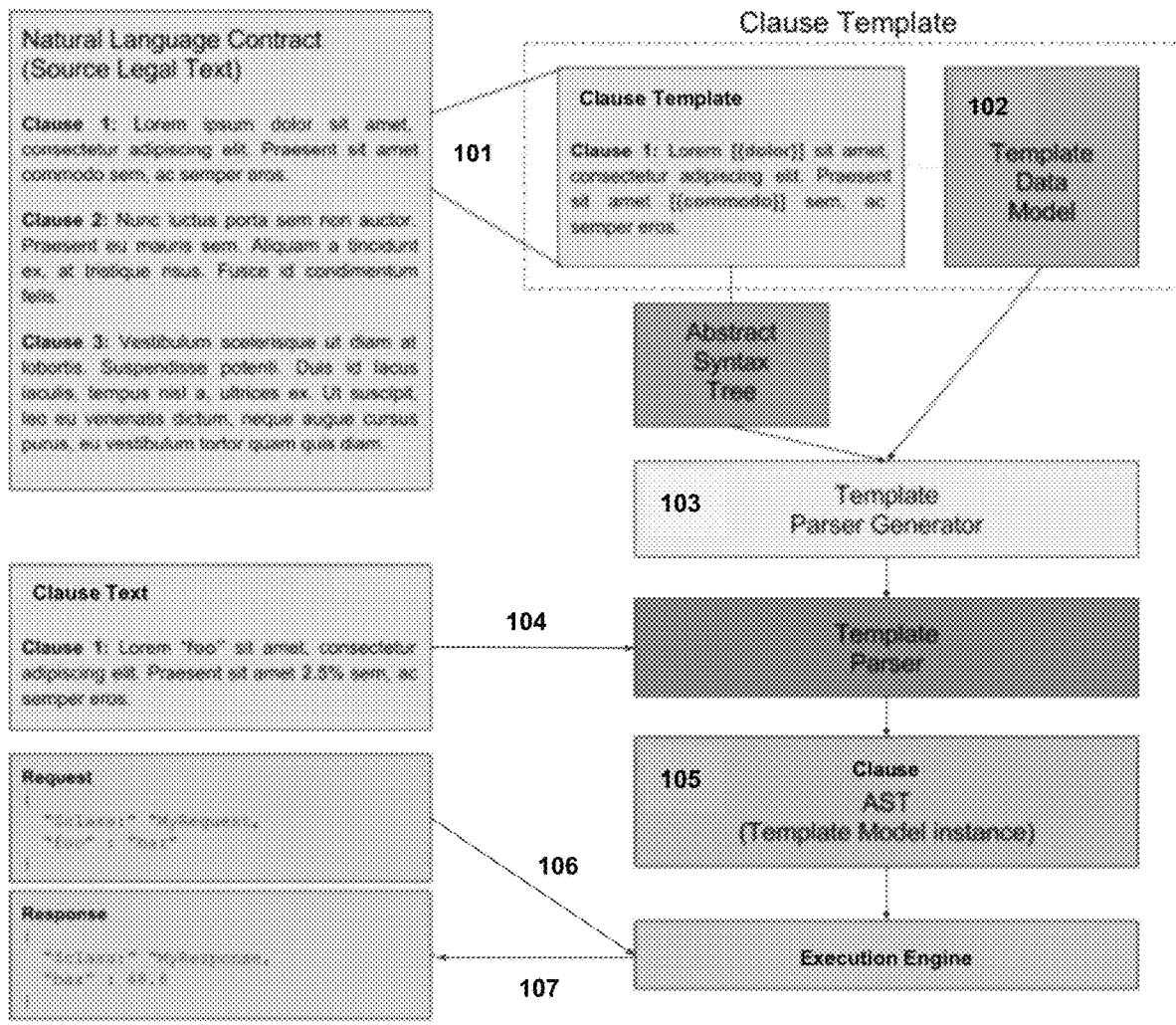
FIG. 13 is a schematic representation of a data-driven contract of a preferred implementation interfacing with execution engine of the system and method.
Figure 16:
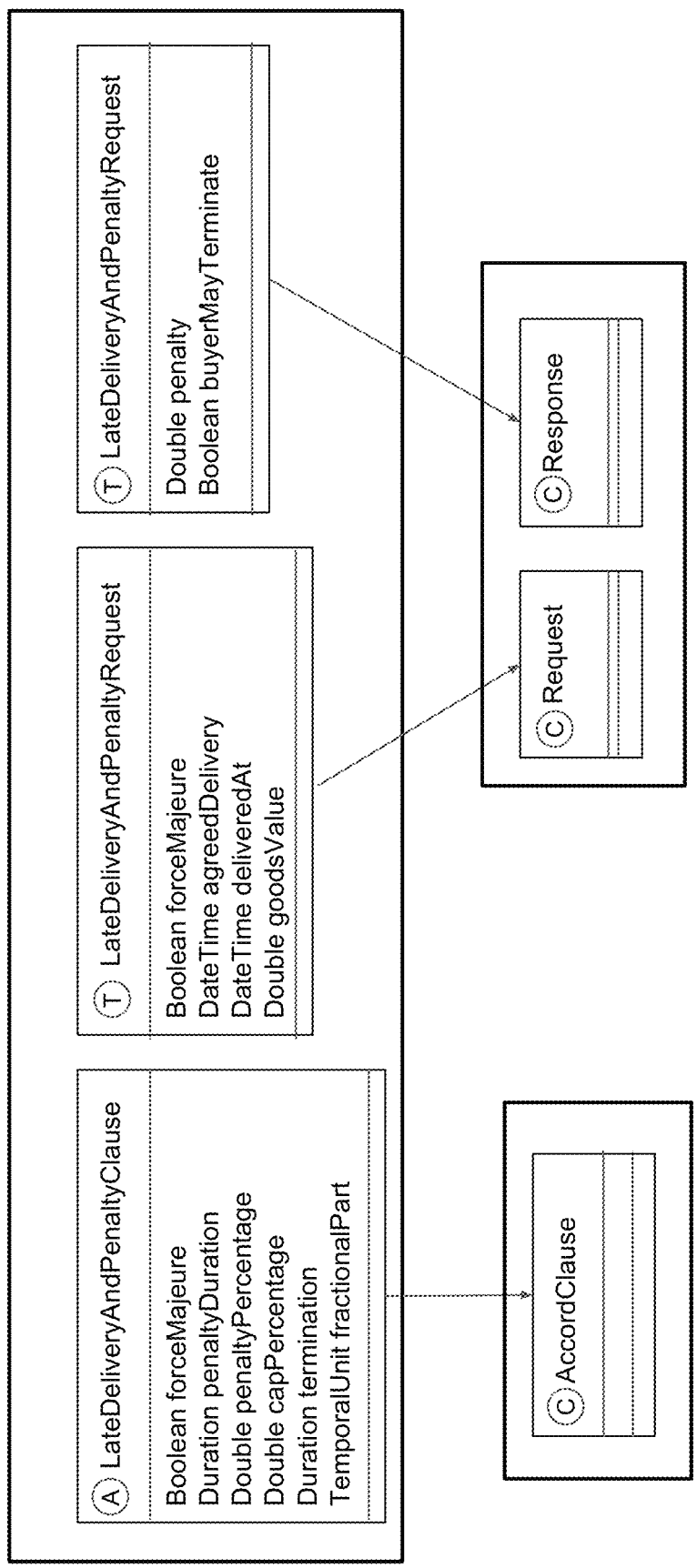
FIG. 16 is a UML schematic of an exemplary data-driven contract of a preferred embodiment.

In another embodiment, the programmable clause of the data-driven contract may include natural language, as depicted in FIGS. 12, 13, and 17. In a preferred variation, a formal template model is used to define the parameters in the natural language text and logic, as depicted in FIG. 16. Together, the text and logic components may be considered an instance of a template. Templates may be on a full contract or part-contract basis (e.g., one or more clauses). Logic may be expressed in any general purpose language, high level language, low level language, machine code, bytecode, or any other suitable approach. Many different execution paradigms (e.g., rule-based, logic inference, temporal, finite state machine, functional, etc.) may be used. A domain specific language for expressing the logic of legal contracts may be used. A domain specific language may have human readable components, grammar, and/or syntax.

Other clause and contract embodiments may be used with the system and method. For example, contract logic may be embedded into a markup language used to markup natural language text of a clause or contract, or contract logic may be run on separate service without being bound with the natural language text, or logic and natural language may be bound together without a data model. Furthermore, the logic of a contract may be located both on- and off-chain, such as where part of a contract logic is executed off-chain and outputs passed to on-chain code to trigger on-chain operations.

Where applicable, the natural language component of the data-driven contract preferably exposes variables (parameters) through use of a markup language or similar. Where applicable, a data model may define the data types associated with the variables. Parameters are passed to the executable logic of the clause/contract.

FIG. 13 depicts exemplary relationships between a data-driven contract of a preferred embodiment and the Execution Engine. In a preferred embodiment of a data-driven contract, a programmable clause is comprised of the natural language of the clause marked-up to expose variables 101. In a preferred embodiment, a data model representing the variables and their associated data types is used (see FIG. 19) 102. A parser is generated from the annotated template natural language and the associated data model 103. The generated template parser can be used to dynamically edit and validate programmable clause variables (i.e. adding parameters) and text (potentially using code completion, error reporting etc.). The contract editor can be embedded on a webpage, or executed as a SaaS service, or run within an IDE 104 (see FIG. 15). The output of the template parser is an instance of the template model (e.g. a JSON abstract syntax tree that can be deployed to the Execution Engine). The abstract syntax tree captures a machine readable and cryptographically hashable object representation of all the executable data extracted from the text 105. The output of the parser (e.g. the JSON document) is feed to the Execution Engine that represents the request instances, which themselves may be modeled in the template data model. The requests represent events of significance to the clause from external resources (e.g. deliveries such as depicted in FIG. 17 delivered via resource interfaces as depicted in exemplary fashion in FIGS. 14 and 15) 106. The Execution Engine preferably invokes the logic of the programmable clause, passing in the parameterization data, a context object, and the incoming request. The Execution Engine validates the response and then returns it to the caller. The structure of the response may be modeled in the data model 107 as shown in exemplary fashion in FIG. 16. FIG. 12 provides a graphical representation of an input request and output response object of a preferred data-driven contract embodiment. Each execution cycle takes and state as input and returns a (possibly new) state as well as any external actions/side effects. FIG. 17 provides exemplary request, response, state, and side effect object data for a late delivery and penalty programmable clause.

In this example, a request modeled in the data model (see FIG. 16) is sent to the Execution Engine after being triggered from an inbound adapter (see FIG. 14) such as IoT or API event. A response is computed, providing the penalty due as a result of the 'delivery' input, and a new state object is generated based upon the computation. A 'payment obligation' side effect object is also generated. The payment obligation object provides that based upon the computation of the clause, a payment is owed from one contracting party to another contracting party, taking account of the computed penalty. The objects are added to the object graph as outlined herein (see e.g. FIGS. 4 and 8). The payment obligation data may then be used to inform one or more of the contracting parties in an interface of a contract management system, to trigger an operation on a web service API (e.g. through an outbound adapter as depicted in FIG. 14), or other appropriate operation.

All of the foregoing components, operations, objects, and other entities may be used in a given implementation of the system and method. Alternatively, some of the foregoing components, operations, objects, and other entities may be used in a given implementation of the system and method, and may include additional or alternative components.

Preferably, templates will be at a 'clause level', such that a contract may be composed of a variety of modular, swappable, programmable clauses that may be inserted in a contract document alongside natural language clauses. As shown in FIG. 13, a parser may take input source text and convert it to an instance of a template model. A parser may be automatically generated from the annotated template text and the associated template data model. The parser generation may be completely automatic and may support customization of types and nested grammars. In this fashion, language specification is inherent to the data model and type system. The generated template parser may now be used to dynamically edit and validate source smart clause text (potentially using code completion, error reporting, etc.). The editor may be embedded on a webpage, run within an Integrated Development Environment (IDE), run locally, or any other suitable implementation. The output of the template parser is preferably an instance of a template model (e.g., a JSON document that may be sent to the execution engine). The template model preferably captures a machine readable (and hashable) representation of all the executable data extracted from the clause template text. Preferably, this takes the form of a lightweight schema language that defines namespaces, types and relationships between types. The modeling language preferably includes first-class support for modeling participants (individuals or companies), assets, transactions, enumerations, concepts, events, and preferably includes the typical features of an object oriented modeling language, including inheritance, meta-annotations (decorators), and field specific validators. In addition, the language may include formal semantics defining transitions from the contract state input to the contract state output.

The execution engine is preferably the system element of the computing environment. In some embodiments, the computing environment is comprised of a VM execution engine. The execution engine invokes the contract logic for the template, passing in the parameterization data, one or more context objects, and the incoming request (where applicable). The execution engine preferably validates the response and then returns it to the caller. The structure of the response may be modeled in the template data model. The execution engine may take any suitable form. In a preferred embodiment, the execution engine takes the form detailed below. Other appropriate approaches may be taken to execute a clause and return a response. In some embodiments, a request/response model may not be used (see, for example, the example below depicted in FIGS. 4, 8, 9A and 9B).

An example may be provided by the following late delivery and penalty clause:

In case of delayed delivery *except for Force Majeure cases*, the Seller shall pay to the Buyer for every *2 weeks* of delay penalty amounting to *10.5%* of total value of the Equipment whose delivery has been delayed. Any fractional part of *a week* is to be considered *a full week*. The total amount of penalty shall not, however, exceed *55%* of the total value of the Equipment involved in late delivery. If the delay is more than *10 weeks*, the Buyer is entitled to terminate this Contract.

The parameters in the natural language of the clause are marked herein through surrounding asterisks but would preferably be highlighted in some visual manner in a user interface. The natural language for the clause and inserting bindings to the template model, using a markup language. An exemplary marked-up template for the aforementioned clause may be:

In case of delayed delivery[{"except for Force Majeure cases,":? forceMajeure}] the Seller shall pay to the Buyer for every [{penaltyDuration}] of delay penalty amounting to [{penaltyPercentage}]% of the total value of the Equipment whose delivery has been delayed. Any fractional part of a [{fractionalPart}] is to be considered a full [{fractionalPart}]. The total amount of penalty shall not however, exceed [{capPercentage}]% of the total value of the Equipment involved in late delivery. If the delay is more than [{termination}], the Buyer is entitled to terminate this Contract.

The variables are, therefore:

Whether the clause includes a force majeure provision;
Temporal duration for the penalty provision;
Percentage for the penalty provision;
Maximum penalty percentage (cap); and
Temporal duration after which the buyer may terminate the contract.

These data elements preferably comprise the template model (where applicable) for the clause. An example data model is shown in FIG. 19.

stored as content addressed objects that act as inputs. Such objects are exposed to the runtime as data inputs through an integration architecture such as a data layer (see FIG. 14). These events are routed to the logic to perform an appropriate action. In this example, the action is to calculate the penalty amount if delivery is late and signal whether the buyer may terminate the contract.

In one variation, each clause may be invoked as a request/response function. The template's interface to the external resources may therefore occur through a request type and a response type. Other variations may be used, as aforementioned and detailed herein, that do not utilize a request/response paradigm. FIGS. 12 and 17 depict an exemplary visualization of the model, request, and response types. Where applicable, the results of execution may include, but are not limited to:

Outputting/logging details of the clause executed (name, version, SHA256 hash of clause data);
Generating an incoming request object; and
Generating an output response object.

Figure 4:
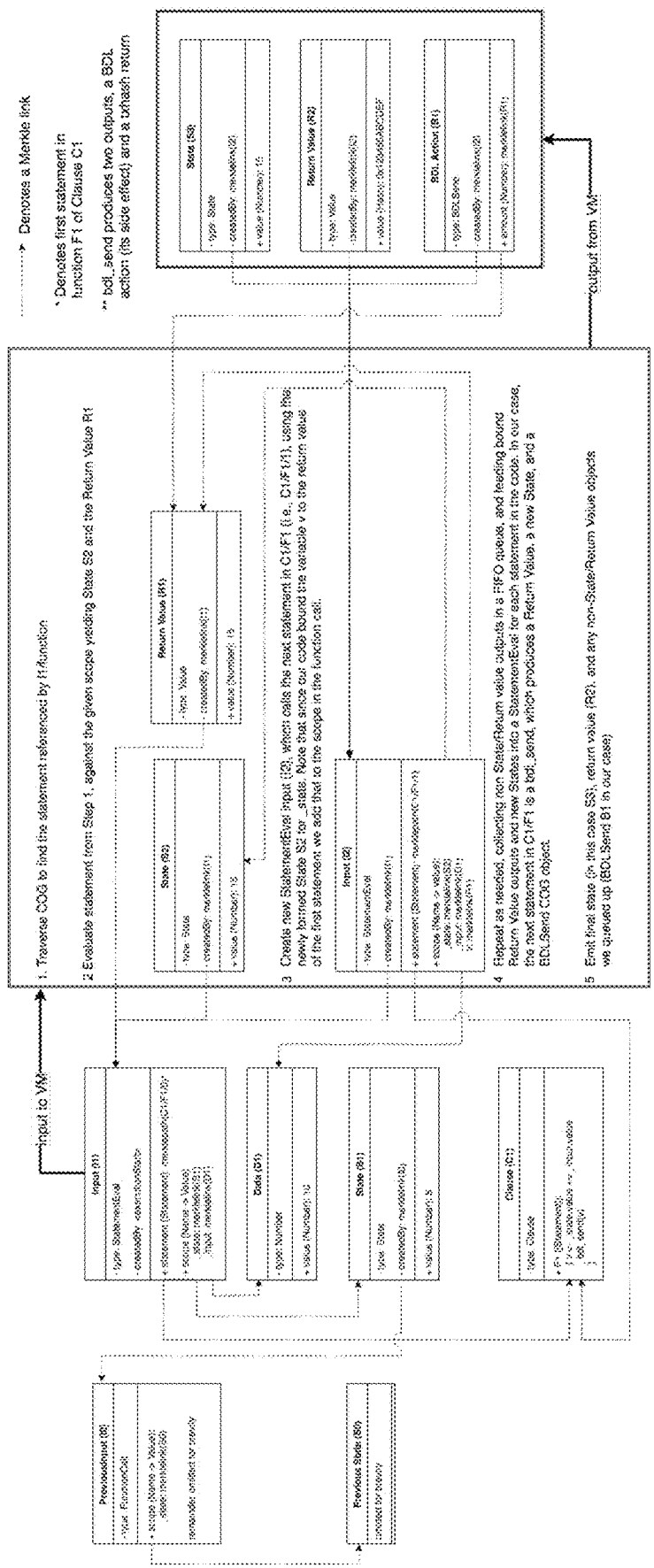
FIG. 4 is a flowchart of an exemplary implementation of an evaluation cycle of the system and method.

The objects output from the computation process are preferably themselves content-addressed and append to the COG as depicted in exemplary fashion in FIG. 4.

FIGS. 12, 16 and 17 depict exemplary instances of a programmable clause in a contract, request data sent to the clause (i.e. a data input), response data generated from execution of the programmable clause, side effect data, and state data. These objects are exemplary and may take any suitable form. The sample side effect event represents a payment obligation calculated and emitted as a result of execution following the data input. Objects generated from execution of a programmable clause may be used to configure external trigger events using an integration architecture (as depicted in exemplary fashion by FIG. 14). The exemplary payment obligation may be utilized by a configured external resource such as a payment gateway API to transfer the funds pursuant to the generated 'obligation' side effect object:

```
{
    "$class":"io.clause.outbound.physical.payments.stripe.StripeCreateCharge",
    "accessToken":"sk_test_XXXXXXXXXXXXXXXXXXXXXXXX",
    "source":"tok_visa",
    "accountId":"acct_XXXXXXXXXXXXXX",
    "amount":response.amount
}
```

Figure 18:
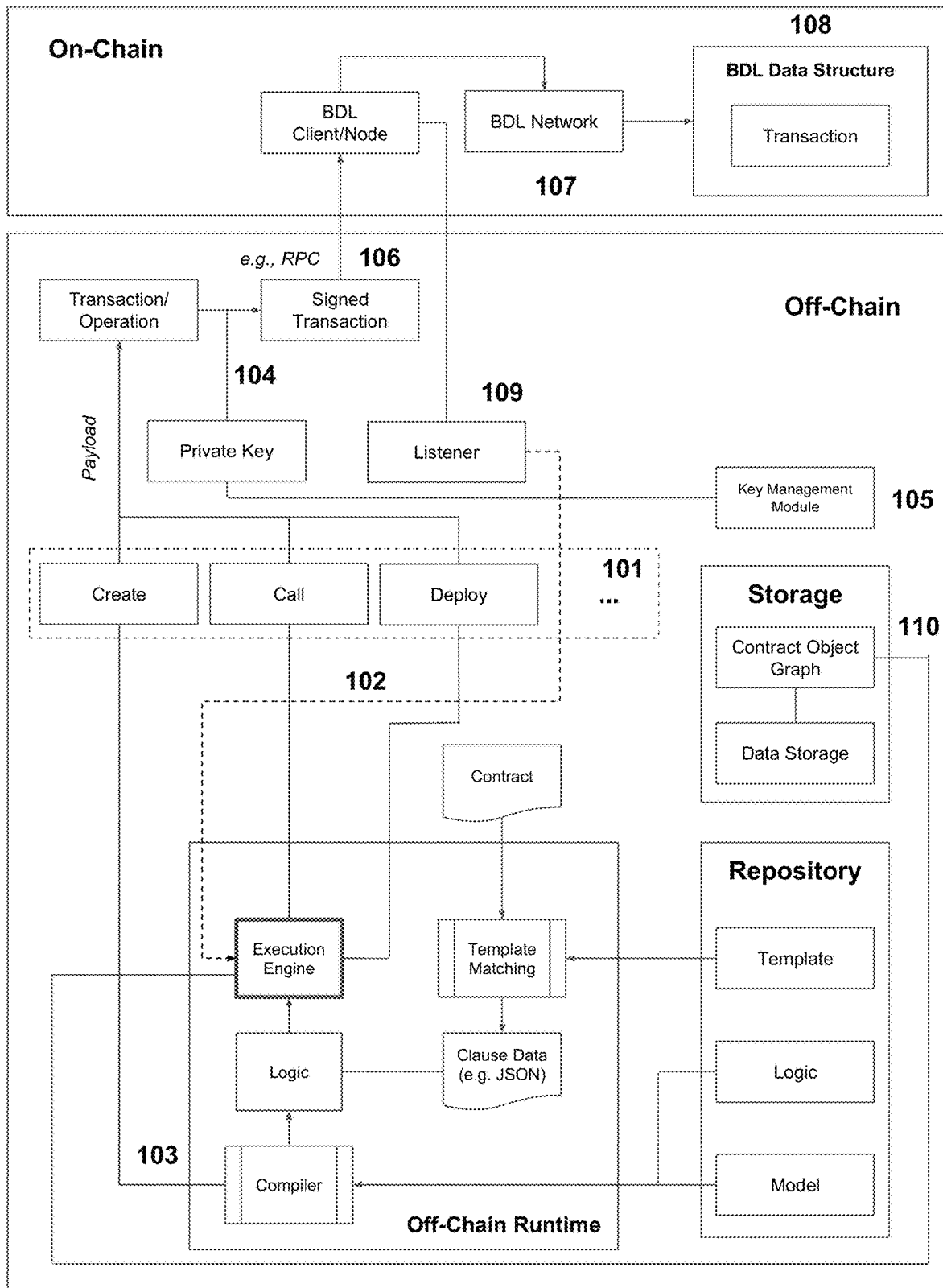
FIG. 18 is a schematic representation of an exemplary interface between a Blockchain/Distributed Ledger (BDL) runtime and an off-chain runtime comprising the system and method.

In this example, "response.amount" references a "MonetaryAmount" in the payment obligation emitted by the clause shown in FIG. 17. Similarly, the configuration may be to perform an on-chain code call via API (as depicted in FIG. 18). An exemplary configuration for an on-chain transfer may be as follows:

```
{
    "$class": "io.clause.outbound.physical.payments.crypto.ethereum.EthereumTransfer",
    "fromAccount":"0xd6a33a691c19169a9e8121d12cfc602fa29f3663",
    "toAccount":"0xf8ebf925868f897c1afc1d2ae5444f3e74677a05",
    "weiValue":response.amount.doubleValue * 10,
    "privateKey": "0x6afe5c024ae7c41983edc026f2122e0b24d934b1982b9d9d552fbb224286bfdc"
}
```

Events from external resources (e.g., freight being shipped, delivered, signed-for, etc.) are exposed to the contract. Events that pertain to the contract are preferably Embodiments of the system and method may, just as with use of request/response paradigm, vary in the use of side effect concepts.

Functions of clause logic may be of any arbitrary complexity. Statements supported in clause logic may include, but are not limited to: evaluating an input; retrieving data from the current clause's state; retrieving data from the master state; retrieving data from an external BDL; computing a new clause state and updating a datum in the current clause's state; generating an output; triggering the invocation of another clause, and use its output in a further statement; and/or transferring execution flow entirely to another function in the same or another clause (this can simply be creating an output to the content-addressed data system and immediately evaluating it). Clause logic may also be implemented using a logical evaluation engine or a rules engine. In these embodiments the flow control is preferably handled implicitly by the logical solver or the rules engine.

Retrieving data from an external resource may take any suitable form, and may depend upon the resource in question. For example, retrieving data from a BDL may include, but is not limited to, checking if a transaction with a specific hash has been executed; the results of such transactions; outputs from, and state of, on-chain scripts; the balance of a given account; data stored in association with a given address; and other appropriate operations.

Invocation of another clause can mean creating a clause output that is immediately evaluated by the VM, which then creates a new state in the current clause representing the branch taken, and resumes execution. That new state can reference the previous state to provide an execution trace.

Flow control/branching may be implemented as a form of statement that is evaluated based on its conditions. Branches and loop-like constructs may cause intermediate clause states to be created and reference each other, thereby creating a execution trail.

Content-Addressed Data System

The content-addressed data system functions as a mechanism for preserving an immutable and non-repudiable record of execution, and thus contract, state. The system preferably references data by its content or a representation of the content (e.g. a cryptographic hash). The content-addressable data system is preferably used in recording data pertaining to the state and execution of the contract including (but not limited to): input, output, state, and/or the output or resulting actions from execution. Separate content-addressable data systems may be used for different types of data. For example, inputs, internal computation state, and outputs may all be stored separately. Alternatively, and preferably, a single unified content-addressable data system is used.

Preferably, the content-addressed data system takes the form of a content-addressed directed acyclic object graph ("contract object graph" or "COG"). The COG is preferably an append-only data structure comprised of a plurality of objects that together represent the state of the contract (e.g. inputs, computational events, state, and outputs). The append-only quality ensures that any change to an object is preserved, and data can only be added, not removed. References to an input, output, state, etc. being stored/exchanged, preferably involves access of such an object being stored in a COG or other suitable content-addressable data system. State changes, as a result of computation, and outputs from the execution engine runtime are appended to the COG (see FIGS. 8, 9A and 9B). These changes function to enable verifiable and auditable execution cycles.

Use of an object from the content-addressable data system can preferably be validated as to its integrity prior to accepting and/or interpreting the object. Preferably, the object components are committed and/or compiled into a Directed Acyclic Graph (DAG) or a Merkle tree structure where hash link structures connect or establish associations between object components (see FIG. 4 and FIGS. 8, 9A and 9B). Objects may be any suitable data structure, but preferably include, and are referenced by, an encoded cryptographic hash of their contents, along with type and an arbitrary data payload (see, for example, FIG. 4). In a preferred variation, the object components are formed as content-addressed object components with Merkle links as a form of "Merkle Directed Acyclic Graph" ("MDAG"). The cryptographic link (i.e. a Merkle link) is a graph edge or reference made through a cryptographic hash of a contents of a target object embedded in that of a source object. Merkle links are depicted in exemplary fashion in FIG. 4 and FIGS. 8, 9A and 9B. Preferably, the state of contract computation may be referenced by a record of the concatenated state of the history of contract execution such as a master state object or Merkle root record. This enables the current state of the contract, all past states, inputs, and computation to be verified by a single object and reference (i.e. the content-addressed hash of that object) as the content of that object includes a concatenated Merkle link reference to each prior object across all prior execution cycles. As such, it uniquely represents the state and history of the contract.

Use of an MDAG data structure may be particularly applicable in some variations. With respect to BDL applications, the MDAG structure can enable an end-to-end cryptographically secure environment between the contract and a blockchain/distributed ledger. Other variations of the COG, a MDAG, or similar content-addressed system may be used without departing from the spirit and scope of the invention.

The data representing the object graph data structure is preferably stored in an backend object store. This may take any suitable form such as a peer-to-peer distributed filesystem or hypermedia protocol (e.g. InterPlanetary File System) or other peer-to-peer system, a cloud-based object store, graph database, local storage, or any other appropriate storage mechanism. Use of a peer-to-peer system may be particularly suited to applications of the system and method that seek to minimize reliance upon a centralized entity for object persistence, and may be especially suited to use with peer-to-peer implementations of the system and method, as stated herein.

Computation Layer

The computation layer of a preferred embodiment functions to access inputs (e.g. data, events, etc.) and current clause logic for performing a variety of sequences of computations. The system and method preferably supports any arbitrary computation. In some variations, the range of computations permitted may be limited. The outputs of these computations may be payloads handled by the output layer. The computation layer can preferably access data from an data layer that represent a variety of resources such as APIs, 'Internet of Things' ('IoT') platforms, 'edge computing devices' (e.g., sensors, actuators, RFID devices etc.), event sourcing and event processing systems/applications (including ESP/CEP systems), Enterprise Resource Planning (ERP) and Customer Relationship Management (CRM) software, BDLs, other database architectures, other clauses within the contract, other data-driven contracts, applications, web services, systems, and/or other accessible resources. These resources are preferably accessible by way of resource interfaces, as depicted in exemplary fashion in FIG. 14. In some instances, the computation layer may be capable of inspecting BDL state of multiple distinct BDLs.

The computation layer is preferably event-driven in that execution and processing of a clause is preferably initiated in response to some new or updated input event or data. The input and/or the clause logic are preferably accessed from and/or committed to the content-addressable data system. Alternatively, these may exist elsewhere. The resulting execution events, output of execution of the input data, and updates to clause logic is preferably similarly logged and stored in the content-addressable data system in accordance with any consensus mechanisms. Input entering through the computation layer allows the state to be deterministically set before evaluating a clause or set of clauses. The computation layer in some implementations may not be Turing-complete. Loops, if any are to be used, may be bounded. Transformations that use unbounded loops may be executed prior to processing by the computing environment. As the computing environment is event-driven, processing of unbounded loops is preferably not needed.

Output Layer

The output layer of a preferred embodiment functions to perform actions as directed by the output of the computation layer. This may include performing external actions on external systems (see FIG. 14). The output layer can facilitate updates to internal resources such as updates to a current or other clause, updates to programmatically accessible resource, and/or update integration with one or more BDL systems. The output layer preferably also integrates with the content-addressable data system to store contract state and other computational outputs.

3. Method for Computing a Data-Driven Contract

Figure 2:
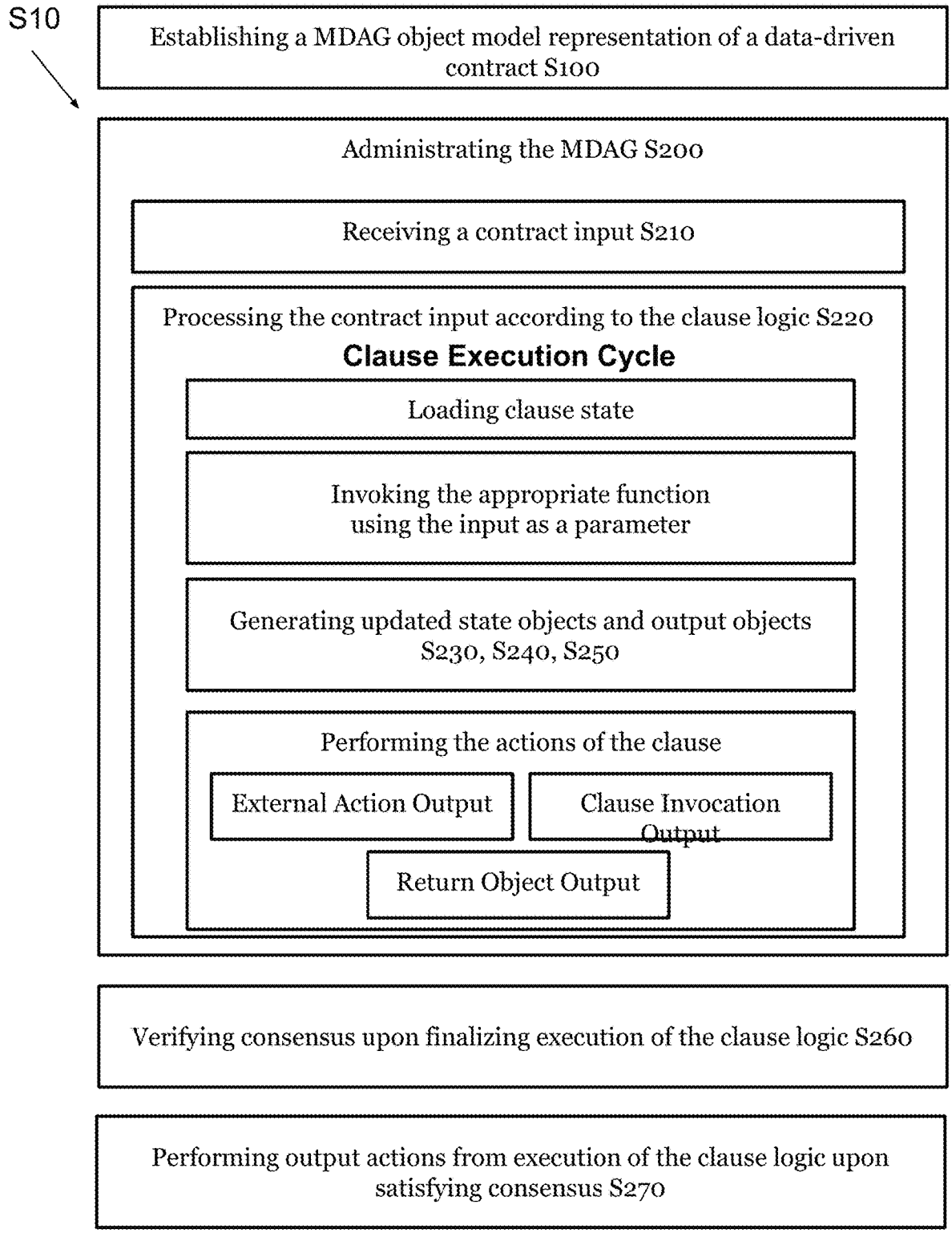
FIG. 2 is a process flow representation of a method of a preferred embodiment.

As shown in exemplary fashion in FIG. 2, a method for execution of a data-driven legal contract can include establishing a MDAG object model representation S100 and administrating the MDAG in accordance with the data-driven contract S200. Administrating the MDAG S200 is preferably an iterative process wherein an execution instance of the MDAG by a computing environment can include receiving a contract input to the contract logic of the data-driven contract S210, processing the contract input according to the clause logic S220, generating at least one updated state object S230, generating at least one output object S240, and hash-linking a generated object to an object associated with the creation of the generated object S250.

The execution cycle of administrating the MDAG will typically be performed multiple times in the lifetime of a contract to account for various new inputs to the contract. Modifications or additions to this method may be applied without deviating from the inventive aspect of the method.

The method is preferably implemented by a system such as the one discussed herein, but any suitable system may alternatively implement the method.

In general the method functions to take contract input and current state of the contract, apply computation, and generate outputs and new states, which is manifested through use of hash-linking objects of the MDAG. The method is preferably used to provide a deterministic and consensus-based computing environment that functions to systematically process the logic of a contract in coordination with a MDAG object model of a data-driven contract. Preferably, the method is used in administrating the computed state of an executable data-driven contract by way of the MDAG, wherein the MDAG is transitioned by a computing environment through generating and hash-linking objects through computation cycles.

The method can additionally enable a consensus process used in maintaining a content-addressed data system. Execution of the method by a computing environment can generate an auditable trail of inputs, logic, computational state, data, return values of logic, and/or output. The method is preferably applied to a data-driven contract composed of one or more programmable clauses. In one implementation, the data-driven contract may include a master clause to manage contract-level data and variables as well as control flow logic in the form of event dispatch matrix used in directing execution and inputs to an appropriate clause or clauses. A master clause is used to reference a main or current clause for processing, but the method may be applied to any suitable clause. Other implementations may use alternative approaches or mechanisms for directing the execution cycle. The method can preferably integrate multi-party consensus approaches to the updating of a content-addressed data system, such as by using one of the consensus mechanisms described herein or other suitable consensus mechanisms. The consensus mechanism may assist in ensuring the parties are agreed upon the state of the contract at various stages in the computation cycle. Alternatively, execution may occur without a consensus mechanism. Where applicable, consensus mechanisms may employ any suitable algorithm for establishing consensus as to contract execution between a plurality of parties. Consensus may be handled by a consensus engine component of the execution engine; an engine that operates externally to the execution engine; by a consensus mechanism built into the execution engine; or other appropriate approach. Where a consensus engine is used, this utilize an interface with the execution engine to handle consensus management. Use of a separate consensus engine may enable 'pluggable' consensus mechanisms and algorithms.

Block S100, which includes establishing a MDAG object model, functions to setup or initialize a MDAG data structure used in executing a data-driven contract within a computing environment. Establishing a MDAG and the general instantiation of the MDAG in accordance with the properties of a data-driven contract may be created by negotiation using a contract management system. Preferably, the data-driven contract is a legal contract between at two or more parties. A template parser as described herein and/or other interpreter components may be used to form a MDAG object model from a data-driven contract from some form (e.g., natural language, model, etc.). The method may alternatively be implemented on an existing MDAG wherein, establishing a MDAG object model may not involve the creation or initial instantiation of the MDAG but instead retrieve an existing MDAG from some source. The MDAG may be implemented in any suitable manner. Establishing the MDAG and subsequent use and interactions with the MDAG may include interfacing with a particular MDAG-based system.

In one variation, establishing a MDAG object model may additionally include loading a master state, which functions to access a current state. In initializing the method, a genesis master state can be deployed within a network that contains the initial states and clause logic. This master state can contain the initial event dispatch matrix (if applicable) and references to the initial states of the contract's constituent clauses. More generally, the master state can include an inter-clause logic controller that functions as a mechanism or engine for allowing clauses to share a data space and to implement chaining or logic inference between clauses. The genesis master state can be represented as a special input in the system consensus cycle. This genesis master state can also contain the executable logic of all of the clauses of the contract, including the master clause.

In one variation, involved parties can form a peer-to-peer network with a consensus algorithm such as Practical Byzantine Fault Tolerance (PBFT), Raft, and/or other consensus algorithms using the genesis master state. During initialization, the genesis master state can be tracked as the latest state. Alternatively, a consensus mechanism may be used without using a peer-to-peer network, such as where the method is implemented in a non-distributed environment.

The master state object in the MDAG can be substantially similar to other clause state objects, but may include additional data such as: global variables to be used by other clauses; identifiers, configuration, and/or state information of external BDLs; an event dispatch matrix (or inter-clause logic controller) to be used by a master clause to determine how to handle inputs from the data layer; a reference to the previous master state, much like a clause state can have a reference to previous clause states; and/or a reference to the input(s) which caused this master state to ultimately be created, as per other clause states represented as COG objects.

During the course of the use of the MDAG either during establishment or during use with the administration of the data-driven contract, the MDAG can include a variety of types of objects associated with the administration of the data-driven contract. Types of objects in the MDAG can include state objects, objects associated with clause logic of at least one programmable clause of the data-driven contract, objects that are data objects, response objects, output objects. Each of these may have a hash-linked version history created through the administration of the data-driven contract.

Block S200, which includes administrating the MDAG in accordance with the data-driven contract, functions to execute the data-driven contract by processing the MDAG. A data-driven contract is preferably performed by iteratively executing and evaluate clause logic of the data-driven contract in response to contract inputs (which may be instantiated as updates to the MDAG). During administration of the data-driven contract, updated object nodes (e.g., appended as updated versions of another node in the append-only MDAG) in the MDAG will be generated and hash-linked to the corresponding object(s) from which it was created, and output objects will similarly be generated and hash-linked to the corresponding object(s) from which it was created. Other approaches to hash-linking objects may be used in variations.

Administrating the MDAG S200 is preferably performed by a computing environment. In one variation, the computing environment is a virtual machine computing environment. In another variation, the virtual machine is run on a plurality of computing hosts within a peer-to-peer network. The computing environment may alternatively be any suitable computing environment described herein or otherwise.

Administrating the MDAG S200 is preferably an iterative process wherein an execution instance can include receiving a contract input to contract logic of the data-driven contract S210, processing the input according to the clause logic S220, generating at least one updated state object S230, generating at least one output object S240, and hash-linking a generated object to an object associated with the creation of the generated object S250.

Block S210, which includes receiving a contract input to contract logic of the data-driven contract, functions to receive some input that triggers evaluation and an execution cycle of the data-driven contract. The computing environment executing the method is preferably event-driven, wherein evaluation and execution of contract/clause logics is triggered by new inputs. Preferably, the contract input can originate from one of the following: an edge computing device, a distributed ledger system, or data retrieved through an application programming interface.

An input may be a new piece of information received or retrieved from some data source via a data layer. The input could also be an output of a clause to trigger the logic of another clause. Where a master clause is used, the incoming data event type may be submitted to the master clause (or logical inference engine), and is then fed by the master clause to the appropriate clause. In the case of a clause triggered event, the master clause may create an input by dispatching it to a clause for processing. As shown in FIG. 4, an input object may be registered and stored with the MDAG, which then is used as input to the computing environment.

In a preferred variation, the contract input has a hash link reference to a current state object (e.g., a master state object or otherwise), wherein processing the input according to the clause logic will include executing the clause logic based on data of the contract input and the current state object.

An input may comprise a label and an address of its intended recipient. A label can denote the type of input such as periodic data fetch, BDL chain head event, clause logic invocation, API event, BDL transaction confirmation, and the like. The address of its intended recipient can reference a master or a non-master clause. For a non-logic invocation input, some assertion of the input integrity can be included. Clause logic invocation inputs can have their caller encoded in their MDAG (e.g., COG) representation. One role of a master clause can be to transform arbitrary inputs to clause invocation inputs, thereby triggering the correct behavior as necessary for the contract to execute. Accordingly, logic invocation inputs may be the only inputs to non-master clauses. Where a master state is not used, this function may be achieved by references in an input such as a request, as discussed herein.

A periodic data fetch input can be new data retrieved or received from some data source (e.g., from a data layer). A data source that is needed for the contract to operate may have new information that must be acted upon. The format of this input varies with the kind of data that is being fetched, but it preferably has at least an identifier of the data source (e.g., for the master clause to adequately route it), a timestamp, some information to enforce non-repudiation (e.g., cryptographic signature such as from a public/private key pair; TLSnotary secret), and the payload contents of the data fetched. Additional or alternative data may also be used in variations.

A BDL head event functions to be an input used in assessing the state and data from a BDL. A BDL head event can be an event representing a new transaction or block that is received and/or has been confirmed on an external ledger with which a contract is configured for interaction. The BDL head event input can function to avoid scenarios where parties exit consensus due to potentially different views of an external BDL. The format of a BDL head event input may vary depending on the form of BDL, but may typically comprise at least a cryptographic hash referencing what should be considered the latest block in the BDL and an identifier of the BDL as used in the contract. Other formats and data may be utilized with the system and method. The computing environment preferably behaves as though whatever the latest BDL head event describes is the latest state of the BDL, regardless whether or not that is actually the case. That is to say, the computing environment preferably does not utilize any state that would come later in the BDL's history until it has processed a BDL head event that enables such a state.

A clause logic invocation functions to trigger logic of a particular clause. Such inputs are generally produced by either the master clause or other clauses in the contract. An alternative approach that may be used by a contract author is to invoke specific contract logic periodically using input submitted through the data layer. Such an input may skip the dispatching logic in the master clause and invoke a function inside a clause directly, but would still produce an intermediary and final master state that must be consented on once processed. Alternatively, the master state may recognize that a clause logic invocation is occurring and pass it on to the appropriate clause.

In a variation using a master clause, administrating the MDAG in association with contract input can involve initializing an updated master state, which functions to create an intermediary master state record. The intermediary master state record can initially be identical to the latest master state except a reference to the last master state can be updated to refer to the current latest master state. In this way, a versioned record of master states can be linked. The intermediary master state record is preferably used in recording updated state information, which can be committed after completion of execution of all clause logic, and optionally establishing consensus in blocks S260 and S270.

Block S220, which includes processing the contract input according to the clause logic, functions to evaluate clause logic in response to the new input. Executing clause logic is preferably iterative.

In one preferred implementation where a master state object is used, S220 preferably initiates by executing clause logic of the master clause. Execution of the master clause preferably includes processing of the input according to logic of the master clause and optionally the dispatching of execution to other clause logic objects referenced in the MDAG. The master clause in some cases is used primarily in dispatching to an appropriate clause used to handle that input.

The input is preferably supplied to the master clause during execution. In some instances, the master clause may elect to utilize the input to update its own master state prior to dispatching the input to any clauses that may care about it. For example, a BDL chain head input may lead to an update of the BDL state entry in the master state.

An event dispatch matrix or other suitable inter-clause logic controller of the master clause may specify one or more clauses for targeted invocation. An order of the clauses is preferably specified in the dispatch matrix. Executing a master clause preferably includes executing a clause for each targeted clause. Any clauses that are specified in the event dispatch matrix for the particular event type are invoked in the order they are specified in the matrix. Executing of a clause may share similarities in execution logic to execution of the master clause. Specifically, executing a clause can include loading clause state, invoking the appropriate function dispatch matrix using the input as a parameter, and performing the actions of the clause.

In one variation, the master clause logic (or any suitable clause logic) may have a function to modify its event dispatch matrix. One may use this self-updating function, for example, when wanting to perform an external action and then perform some further operations only after that external action has been performed. A clause that does this may, for example, create an output representing the external action and another output which invokes the "matrix update" function to add a rule to invoke the rest of the logic once an event comes in that represents a response to the external action. This can function to enable callbacks within contract logic.

As an exemplary application, a contract author may want to perform a transaction on a BDL, wait for that transaction to become confirmed, and then perform some other transaction. They could have a clause that: 1) Generates the external action output that performs a BDL transaction; 2) Invokes the matrix modification function to add a listener for BDL chain head events; and 3) Have the listener wait for the BDL transaction that was created earlier to be confirmed, and once it is confirmed, invoke the matrix modification function to unregister itself, and invoke the continuing logic.

Block S230, which includes generating at least one updated state object functions to create at least one new object within the MDAG storing new state information. The new state object is preferably generated as a result of processing the clause logic. The updated state object preferably includes a "created by" field with a hash-link reference to the object(s) associated with the creation of the state object. The process of establishing the hash-link is preferably facilitated by block S250. As shown in FIG. 4, State S2 will be generated in evaluating clause logic C1 in response to Input I1. State S2 will therefore include a Merkle hash link to Input I1 and Clause C1.

Block S240, which includes generating at least one output object, functions to emit an output as a final state of iterative evaluation. The output objects will similarly include a "created by" field with a hash-link reference to the object(s) associated with the creation of the output object. The process of establishing the hash-link is preferably facilitated by block S250.

Upon executing a clause, one or more outputs may be generated by the clause logic. Such outputs may be requests to perform an external action, invocation of one or more clauses, and/or generation of a return object to be returned to the original invoker.

In one variation, the method can include performing an external action in response to an output object in the MDAG. External action outputs can include actions taken on outside systems such as interfacing with and executing a transaction on a BDL, communicating with an external programming interface, communicating with an edge computing device, and/or other actions. The external action outputs are preferably appended to an action queue (e.g., at the end of a FIFO queue). The action outputs are preferably held in the queue in the order of their creation until evaluation of other outputs is complete. A manager of the action queue can sequentially process the external actions under appropriate conditions such as in block S260.

Clause invocation outputs can include invocation of another clause and/or self-referencing invocation. Clause invocation outputs preferably result in appropriate clause logic being invoked with a set of parameters as specified in a similar clause logic execution cycle. Invoking an additional clause logic object is preferably the response to an output object. In the case where clause logic invokes another clause, a similar clause invocation process is initiated for that clause. In the case where the clause logic modifies the present clause's state, a new clause state is preferably created that references the previous clause state and the input that led to the new clause state. The intermediary master state can additionally be updated to reference the previous intermediary master state and to reference the new clause state for the affected clause.

A return object output is preferably one or more values or parameters intended to be returned to the original invoker of the clause. The return object is preferably passed to the caller of the clause along with logic control. In this manner of chaining outputs, it is can be possible to inspect why a certain output was generated, as the trail of COG objects will invariably describe the control flow that led to some result.

In one variation, the method may additionally include verifying consensus upon finalizing execution of the clause logic S260 and performing output actions from execution of the clause logic upon satisfying consensus S270, which functions to use consensus to regulate enforcement of the actions triggered by execution of the data-driven contract.

Block S260, which includes verifying consensus upon finalizing execution of the clause logic, functions to validate the processing of the clause logic and inputs. When the iterative execution of the clause logics has completed, the computing environment will have an updated master state and a sequential list of external actions. The updated master state and the sequential list of external actions can be used in conjunction with the input data that initiated the cycle of execution to perform consensus amongst all parties. In other words, consensus is preferably achieved against the tuple of input, updated master state, and external actions. Practical Byzantine Fault Tolerance (PBFT), Raft, Tendermint consensus, and/or other consensus algorithms or engines may be applied in establishing consensus.

In one implementation during execution, the party which noticed the data layer event proposes an (input, new master state, external actions) tuple. Other parties proceed to evaluate the input to ensure that they end up with the same tuple.

Figure 5:
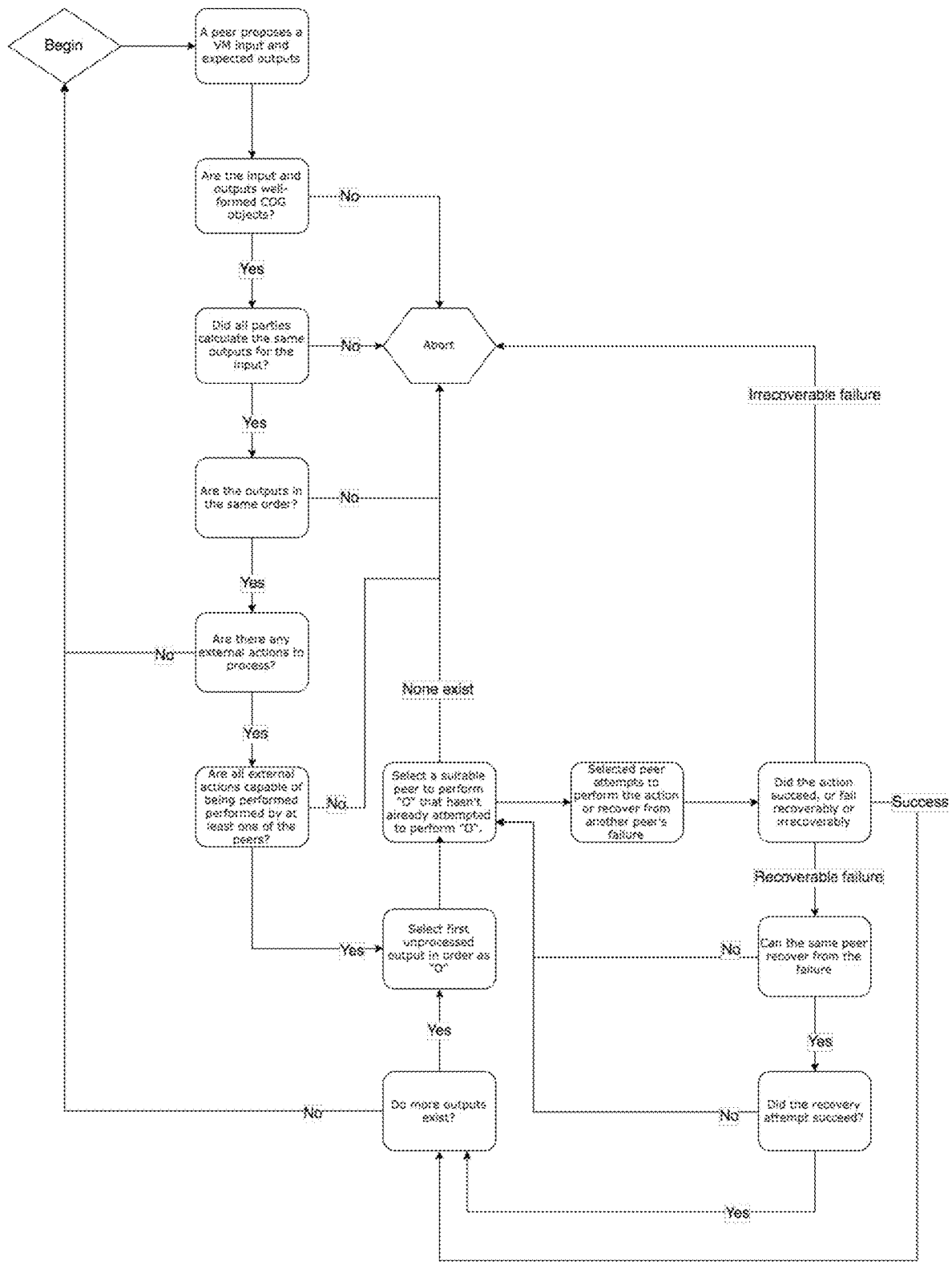
FIG. 5 is an exemplary high-level flowchart representation of one implementation of the system and method.

Block S270, which includes performing output actions from execution of the clause logic upon satisfying consensus, functions to commit the resulting actions of the contract execution cycle. In one implementation, the parties go through all external actions in the order they were emitted by the contract logic, determine who is capable of performing the external actions, and elect an actor to do so. These actions can be establishing transactions with a BDL, issuing API calls, triggering some event, or performing any suitable action. As shown in the example of FIG. 5, blocks S260 and S270 may more specifically be applied by: detecting if there are any external actions to process in response to the output object; if an external action exists, selecting a peer in connection to the computing environment to perform the action; and directing selected peer to attempt the external action. Accordingly, generating output state can then include recording the output state upon success of the external action. If one or more external actions are unable to be performed by any of the parties, the consensus process may be aborted and system administrators are alerted, as this means that there is an error in the configuration of the system and/or the contract logic. Failures of an external action may additionally be addressed by reattempting the external action or reassigning the party selected for performing the action as shown in FIG. 5.

Figure 3:
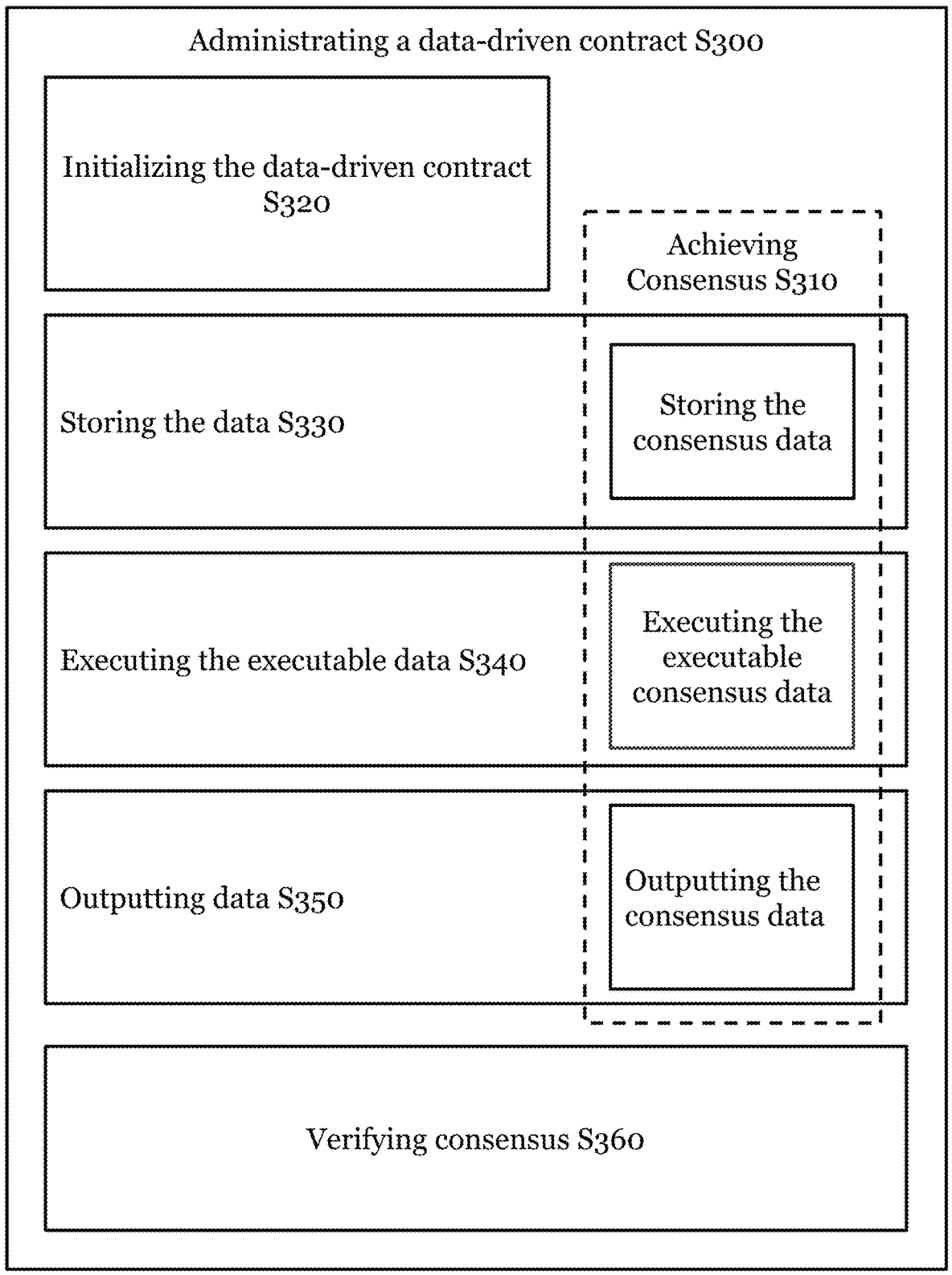
FIG. 3 is a process flow representation for executing and achieving consensus over a data-driven contract document.

4. Alternative Method for Consensus-Based Computing of a Data-Driven Contract Aspects of the method S10 above, may similarly be applied for wider consensus applications. As shown in FIG. 3, a variation of the method for consensus-based computing for a data-driven contract can include of administrating a data-driven contract S300, wherein the data-driven contract is comprised of a set of data and a subset of the set of data is executable data, and administrating the data-driven contract comprises: storing the data S330, executing the executable data S340, outputting data S350, and verifying the data S360. The data-driven contract is a document with a set of at least two involved parties, wherein achieving consensus S310 between the set of involved parties is preferably required prior to any action regarding any subset of data, from the set of data of the data-driven contract, that contains consensus data. That is, storing the data S330 further includes storing the consensus data comprising achieving consensus S310 to store the consensus data; executing the executable data S340 further includes executing executable consensus data, which comprises achieving consensus S310 to execute the executable consensus data; and outputting data S350 further includes outputting the consensus data, which comprises achieving consensus S310 to output the consensus data. Verifying the data S360 further includes verifying consensus to finalize and execute the contract. The method may function in providing a single environment for administrating data-driven contracts that is both robust in verification and flexible in achieving consensus. Implementing the method can generate an auditable trail of inputs, logic, computational state, and output.

Block S300, administrating a data-driven contracts S300 may function to systematically update and process the logic of the data-driven contracts in coordination with a consensus process used in maintaining a deterministic and consensus backed data system. Administrating the data-driven contracts S300 may preferably occur on a virtual VM, but may implement any other desired execution engine of the computing environment. Administrating the data-driven contracts S300 may implement decentralized hypermedia protocols, distributed file systems, or similar protocol for some and or all parts of implementation. Administrating the data-driven contract S300 may occur on a peer-to-peer network, on a private server, on an edge device or any desired platform. Administrating the data-driven contracts S300 may additionally occur on public or private platforms. In some variations, administrating the data-driven contracts S300 occurs on a distributed ledger, either on or off chain.

The method is preferably applied to a data-driven contracts comprising of programmable clauses and non-programmable clauses, wherein a programmable clause may be substantially similar to the programmable clauses described in U.S. patent application Ser. No. 15/476,791, filed on Mar. 31, 2017, which is hereby incorporated in its entirety. A non-programmable component may be a text-based component that may be user readable or processed by a computer using natural language processing (NLP). The method may alternatively be applied to any executable document that includes programmable logic. The data-driven contract is preferably a legal contract that is intended to be legally binding. That is, prior to execution of the data-driven contract, the data-driven contract preferably has a set of at least two involved parties that can make decisions regarding the contract by achieving consensus.

In one implementation, the data-driven contract may include a master clause to manage contract-level data and variables as well as control flow logic in the form of event dispatch matrix used in directing execution and inputs to an appropriate programmable clause or programmable clauses. A master clause is used to reference a main or current programmable clause for processing.

In another implementation, no master clause may be used, and clause invocation may be orchestrated by way of references in input requests to the logic of a programmable clause.

Block S310, which includes achieving consensus, functions to control the flow of the data-driven contract by requiring agreement of the involved parties prior to an action occurring with regards to the data-driven contract. Achieving consensus S310 may be a single event step (i.e. all or nothing), wherein the involved parties come to a single agreement and the data-driven contract is finalized and executed. Alternatively, achieving consensus S310 may occur for multiple steps, and/or iteratively allowing for step-by-step control of the actions and executions of the data-driven contract. Achieving consensus S310 may lead to a Boolean type action (e.g., consensus is achieved and an action occurs, consensus is not achieved and an action does not occur). Alternatively, achieving consensus S310 may result in multiple possible outcomes. For example, the action dependent on achieving consensus S310 may depend on how unanimous the consensus was. Achieving consensus S310 may be determined by meeting a stipulated condition, wherein the stipulated condition is any condition agreed upon by the involved parties prior to achieving consensus. Examples of actions that may be implemented through achieving consensus S310 for a contract may include any action that may be implemented for a "non-electronic" contract, in addition to unique "electronic" actions not available in the case of the former. Common actions may include: adding involved parties to the contract, removing involved parties from contract, cancelling contract, executing the contract, changing basic terms of the contract (e.g. price, quantity, etc.). Unique "electronic" actions may include: automating basic terms, iteratively updating the contract terms, and instituting automated implementation.

Performing an action by achieving consensus S310 preferably requires meeting a stipulated condition. The stipulated condition may be the same stipulated condition for all actions. Alternatively, each individual action, or some actions may have different stipulated conditions. The stipulated condition may be automated or flexible, as decided upon by the involved parties. Examples of automated stipulated conditions include: taking an action on a specific date, after a specific event occurs, or taking action at some interval(s). Examples of flexible conditions may include a simple majority vote where involved parties may change their minds anytime prior to achieving consensus S310. Another example implementing a majority vote could be where some involved parties have no voting privileges. Alternatively, some involved parties may have multiple votes. In one preferred example, involved parties comprise of nodes of a private peer-to-peer network or distributed ledger, and the stipulated condition is distributed ledger consensus over the peer-to-peer network.

Achieving consensus S310 is preferably with regards to a particular action to be taken with respect to the data-driven contract. In that manner the data for a joint contract may include consensus data with respect to one or some actions, but considered non-consensus data with respect to other actions. For example, for a private sales contract, both a buyer and seller may have a specific product for transaction in mind that is immutable. Thus the actual product for sale is non-consensus data and will not change throughout the life of the contract. As the contract parties want to maintain the privacy of the sale, the outputting of the product for sale to the public is set as consensus data. That is, product information with respect to outputting product information, is consensus data that requires achieving consensus S310; while product information with respect to changing the product information, is non-consensus data and fixed.

Achieving consensus S310 may additionally change consensus data into non-consensus data. In some variations, a stipulated condition may be set to convert consensus data into non-consensus data. Achieving consensus S310 may additionally change the stipulated condition. For example, the involved parties of a sales contract (a buyer and a seller) may decide by unanimous agreement (the current stipulated condition for the contract) to finalize their transaction on July 4th (the new stipulated condition for sale) regardless of what either of the involved parties may want on the finalized sale date.

Block S320 initializing the data-driven contract is preferably a component of administrating a data-driven contract S300. Initializing the data-driven contract S320 functions to setup the data-driven contract. Initializing the data-driven contract S320 can include obtaining and setting the initial state of the data-driven contract, wherein the initial state of the data-driven contract includes declaration of the involved parties and the stipulated conditions of the data-driven contract. Obtaining the data-driven contract may comprise of getting the data-driven contract from some external source, e.g. a document database, a document repository, website. In preferred variations, getting the contract may comprise of obtaining the contract from an internally, or externally, managed contract management system (CMS). In general, initializing a data-driven contract in preparation for or in starting execution of the data-driven contract will include receiving a signature of involved parties. One variation may use a traditional e-signature approach where an signature platform is used to collect signatures from the various parties. In another variation cryptographic signing and verification through a blockchain or other suitable digital forms of signature and recording may be used.

Traditional signature using existing signature platform or systems. After all signatures the execution of the contract can be initiated.

Initializing the data-driven contract S320 may further include setting the initial state of the data-driven contract (e.g. master state). Setting the initial state functions to "enable" the data-driven contract, making the data-driven contract executable. Setting the master state of the data-driven contract may set all necessary variables, set the stipulated conditions and their associated actions, set how executable data should be executed, and set the involved parties of the joint contract. Setting the initial state may include deploying a genesis master state. A genesis master state may be created in many ways, for example, by negotiation using a contract management system.

A genesis master state can be deployed within a network that contains the initial states and clause logic. This master state can contain the initial event dispatch matrix (if applicable) and references to the initial states of the contract's constituent clauses. More generally, the master state can include an inter-clause logic controller that functions as a mechanism or engine for allowing clauses to share a data space and to implement chaining or logic inference between clauses. The genesis master state can be represented as a special input in the system consensus cycle. This genesis master state can also contain the executable logic of all of the clauses of the contract, including the master clause. During initializing the data-driven contract S320, the genesis master state can be tracked as the latest state.

Declaring the involved parties and the stipulated conditions of the data-driven contract is preferably a component of initializing the data-driven contract S320. Declaring the involved parties and the stipulated conditions functions to enable the consensus decision making process of the data-driven contract. Involved parties can form a network with a consensus algorithm such as Practical Byzantine Fault Tolerance (PBFT), Raft, and/or other consensus algorithms using the genesis master state.

The master state can be substantially similar to other clause state objects, but may include additional data such as: global variables to be used by other clauses; identifiers, configuration, and/or state information of external blockchain/distributed ledgers (BDLs); an event dispatch matrix (or inter-clause logic controller) to be used by a master clause to determine how to handle inputs from the data layer; a reference to the previous master state, much like a clause state, can have a reference to previous clause states; and/or a reference to the input(s) which caused this master state to ultimately be created, as per other clause states represented as a contract object graph (COG) objects.

Block S330, includes storing the data, functions to maintain and update the data-driven contract. Storing the data S330 preferably occurs through the data layer of the system. Data is preferably stored in an appendable graph structure that maintains both the current state of the data-driven contract and all histories (versions) of the data-driven contract The data is preferably stored in a Merkle Directed Acyclic Graph (DAG).

Storing the data S330 may maintain and update both consensus data and non-consensus data. Storing non-consensus data may occur as necessary, wherein storing the data S330 may occur in a semi-automated fashion. Examples may include: automated state changes of the data-driven contract, moving storage location, system backups, and the like. Storing consensus data preferably involves achieving consensus S310 to store consensus data. Storing consensus data may thus require consensus of involved parties. In some variations, although achieving consensus S310 may fail, storing the data S330 may update the joint contract to record the failure to achieve consensus. Alternatively, storing the data S330 may not store a failed attempt to achieve consensus.

Storing the data S330 may occur locally, and/or remotely, in a single location or multiple locations. In some variations, storing the data S330 occurs over a distributed ledger (public or private), wherein copies of the data are replicated across the various instances of the ledger. Examples of storage locations may include, but are not limited to: databases, document libraries, contract management systems (CMS), private or public servers, and/or any public or private storage devices.

Storing the data S330 may require communication within or outside of the data layer. Storing the data S330 may preferably be compatible and/or implement hypermedia protocols, edge computing devices, blockchain, distributed ledger technologies (DLT), enterprise systems, and/or any other protocols or systems as desired. A hypermedia protocol is preferably any suitable protocol and network system configured for a content-addressable, peer-to-peer approach for storage/sharing of hypermedia in a distributed file system such as IPFS (InterPlanetary File System) though suitable alternatives may also be used.

Maintaining and updating the data-driven contract are preferably components of storing the data S330. Maintaining the data-driven contract preferably maintains the current state of data-driven contract and all histories of the data-driven contract. Updating the data-driven contract may update and change the current state of the data-driven contract as desired or necessary by internal or external stimuli. Updating the data-driven contract may include receiving an updated document input and functions to trigger document processing because of a new event received from the data layer. In some variations administrating the data-driven contract S300 receives an updated document, which is then implemented by updating the document.

Updating the data-driven contract may be initiated in connection with updated data input. An input may be a new piece of information received or retrieved from some data source via a data layer. The input could also be an output of a clause to trigger the logic of another clause. The input data logic may be programmable clause logic. Where a master clause is used, the incoming data event type may be submitted to the master clause (or logical inference engine), and is then fed by the master clause to the appropriate clause. In the case of a programmable clause triggered event, the master clause may create an input by dispatching it to a clause for processing. An input may comprise a label and an address of its intended recipient. A label can denote the type of input such as periodic data fetch, BDL chain head event, clause logic invocation, API event, BDL transaction confirmation, and the like. An address of its intended recipient can reference a master or a non-master clause. For a non-logic invocation input, some assertion of its integrity can be included. Clause logic invocation inputs can have their caller encoded in their COG representation. One role of a master clause can be to transform arbitrary inputs to clause invocation inputs, thereby triggering the correct behavior as necessary for the contract to execute. Accordingly, logic invocation inputs may be the only inputs to non-master clauses.

Updating data may implement a periodic data fetch. Data fetch input can be new data retrieved or received from some data source (e.g., from a data layer). A data source that is needed for the contract to operate may have new information that must be acted upon. The format of the input varies with the kind of data that is being fetched, but preferably has at least an identifier of the data source (to allow for the master clause to adequately route it), a timestamp, some information to enforce non-repudiation (e.g., cryptographic signature such as from a public/private key pair; TLSnotary secret), and the payload contents of the data fetched.

Updating the data-driven contract may occur through a BDL head event. A BDL head event functions to as an input used in assessing the state and data from a BDL. A BDL head event can be an event representing a new transaction or block that is received and/or has been confirmed on an external ledger with which a contract is configured for interaction. The BDL head event input can function to avoid scenarios where parties exit consensus due to potentially different views of an external BDL. The format of a BDL head event input may vary depending on the form of BDL, but may typically comprise at least of a cryptographic hash referencing what should be considered the latest block in the BDL and an identifier of the BDL as used in the contract. Other formats and data may be utilized with the system and method. The computing environment preferably behaves as though whatever the latest BDL head event describes is the latest state of the BDL, regardless whether or not that is actually the case. That is to say, the computing environment preferably does not utilize any state that would come later in the BDL's history until it has processed a BDL head event that enables such a state.

For the example with a preferred master state, updating the data-driven contract may create an intermediary master state. The intermediary master state may enable linking of versioned records of master states by recording updated states of the master state prior to and during executing the executable data of the master state. The intermediary master state can initially be identical to the master state except for the intermediary master state may also include a reference to the latest master state. The intermediary master state may additionally update the reference as the latest master state changes. The intermediary master state may function in recording updated state information, which can be committed after completion of execution of all clause logic, including achieving consensus.

Block S340, which includes executing the executable data, may function to execute some and/or all executable logic within the data-driven contract. Executing the executable data may occur in any operable desired environment that is the execution engine (e.g., the system infrastructure of the computing environment. In a preferred variation the execution engine comprises of a VM. The executable data preferably comprises of programmable clauses, but may alternatively comprise of other forms of program logic. Executing the executable data may be a single event, wherein a single piece of executable data is executed, a subset of executable data is executed, or all executable data is executed simultaneously; additionally and/or alternatively, executing the executable data may be a succession of method calls executing the executable data in some form of cascade; additionally and/or alternatively, executing the executable data may occur iteratively, wherein a subset of executable data is executed multiple times; or executing the executable data may occur in any combination of the aforementioned methods.

In the case of executing the executable consensus data, executing the executable data S340 may include achieving consensus S310 to execute the executable consensus data. Additionally, executing the executable consensus data preferably includes executing the data-driven contract, i.e. finalizing and executing the data-driven contract with all incorporated stipulations agreed upon by the active parties.

For programmable clauses of a data-driven contract, executing the executable data S340 may include executing the clause logic. Executing the clause logic functions to trigger logic of a particular clause. Such inputs are generally produced by either the master clause or other programmable clauses in the data-driven contract. An alternative approach that may be used by a contract author is in executing the specific contract logic periodically using input submitted through the data layer. Such an input may skip the dispatching logic in the master clause and executing a function inside a programmable clause directly, but would still produce an intermediary and final master state that may require achieving consented once processed. Alternatively, the master state may recognize that a clause logic execution is occurring and pass it on to the appropriate programmable clause.

Iteratively executing clause logic of a contract functions to evaluate clause logic in response to the new input. Iteratively executing clause logic is preferably initiated by executing the clause logic of the master clause.

Execution of the master clause preferably includes processing of the input according to logic of the master clause and optionally the dispatching of other clauses in facilitating execution. The master clause in some cases is used primarily in dispatching to an appropriate clause used to handle that input.

As discussed previously, prior to executing the master state, storing the data S330 may update the master state and create an intermediary master state. The master clause may utilize the intermediary master state to update its own state prior to dispatching input to any clauses. For example, a BDL chain head input may lead to an update of the BDL state entry in the master state).

For target execution, executing the executable data S340 may utilize an event dispatch matrix. Alternatively, another suitable inter-clause logic controller of the master clause may specify one or more clauses for targeted execution. An order of execution of the programmable clauses is preferably specified in the dispatch matrix. Executing a master clause preferably includes executing a programmable clause for each targeted programmable clause. Any programmable clauses that are specified in the event dispatch matrix for a particular event type are executed in the order they are specified in the matrix. Executing of a programmable clause may share similarities in execution logic to execution of the master clause. Specifically, executing a programmable clause can include loading the clause state, utilizing the appropriate function dispatch matrix using the input as a parameter, and performing the actions of the programmable clause. In one variation, the master clause logic (or any suitable clause logic) may have a function to modify its event dispatch matrix. One may use this self-updating function, for example, when wanting to perform an external action and then perform some further operations only after that external action has been performed. A programmable clause that does this may, for example, create an output representing the external action and another output which invokes the "matrix update" function to add a rule to invoke the rest of the logic once an event comes in that represents a response to the external action. This can function to enable callbacks within contract logic.

Block S350, outputting data may function to transfer or communicate data out of the computing environment. Outputting data S350 preferably occurs through the output layer of the computing environment. Outputted data S350 may include communication, executable data, a subset of data from the data-driven contract, and/or other any other type of type data. With respect to the data-driven contract, outputting the consensus data, or consensus related data, preferably requires achieving consensus S310 to output the consensus data S350. Outputting data S350 may occur to any location limited only by desire and connectivity. Outputting data S350 is preferably compatible with IPFS, DLT, edge devices, blockchains, distributed ledgers, DLT, enterprise systems, and may implemented with any new protocol as necessary to interact with the appropriate external environment or system.

Outputting data S350 preferably includes implementing an external action output. External action outputs can include actions taken on outside systems such as a transaction on a BDL, an API call, and/or other actions. The external action outputs are preferably appended to an action queue (e.g., at the end of a FIFO queue). The action outputs are preferably held in the queue in the order of their creation until evaluation of other outputs is complete. A manager of the action queue can sequentially process the external actions under appropriate conditions.

In some variations, executing the executable data S340 may directly lead to an output call and thus, outputting data S350. For example, upon invoking a clause of the data-driven contract, one or more outputs calls may be generated by the clause logic. Examples include requests in performing an external action (e.g. invocation of one or more clauses), and/or generating a return object to be returned to the original involved party (e.g. confirmation of a successful or failed invocation request).

Clause invocation outputs can include invoking another clause and/or self-referencing invocations. Clause invocation outputs preferably result in appropriate clause logic being invoked with a set of parameters as specified in a similar clause logic execution cycle. In the case where clause logic invokes another clause, a similar clause invocation process is initiated for that clause. In the case where the clause logic modifies the present programmable clause's state, a new clause state is preferably created that references the previous clause state and the input that led to the new clause state. The intermediary master state can additionally be updated to reference the previous intermediary master state and to reference the new clause state for the affected programmable clause.

As mentioned previously, invoking a clause of the data-driven contract may include generating a return object output. The return object is preferably passed to the caller of the programmable clause along with logic control. In this manner of chaining outputs, it is possible to inspect how a certain output was generated, as the trail of COG objects will invariably describe the control flow that led to some result.

Block S360, verifying the data may function in determining the veracity of the data-driven contract. Verifying the data S360 preferably functions over versions/histories of the data-driven contract and copies of the data-driven contract. For example, verifying the data S360 may examine "copies" of the data-driven contract kept and maintained by the involved parties, control that the data-driven contract are identical, and potentially identify which "copy" of the data-driven contract is incorrect. Preferably, verifying the data S360 may utilize the hashes of the Merkle DAG structure of the data-driven contract to identify that the data-driven contract is self-consistently valid. In some variations verifying the data S360 may utilize a master copy of the data-driven contract to verify the data.

Verifying consensus is preferably a component of verifying the data S360. Verifying consensus functions to control data-driven contract state changes that require achieving consensus S310. Verifying consensus may verify that consensus has been achieved and that the correct state change will be implemented, or has been implemented.

Verifying consensus is preferably a component of verifying the data S360. Verifying consensus functions to control data-driven contract state changes requiring achieving consensus S310. Verifying consensus may verify that consensus has been achieved and that the correct state change will be implemented. Verifying consensus may commit resulting actions of the contract execution cycle. In one implementation of verifying consensus, the involved parties go through all external actions in the order they were emitted by the contract logic and determine who is capable of performing the actions and electing an actor to do so. These actions can be establishing transactions with a BDL, issuing API calls, triggering some event, or performing any suitable action. If one or more external actions are unable to be performed by any of the parties, the consensus process may be aborted and system administrators are alerted, as this means that there is an error in the configuration of the system and/or the contract logic.

Verifying consensus preferably finalizes execution of the clause logic. Finalizing the execution of the clause logic may validate the processing of the clause logic and inputs. When the iterative execution of the clause logics has completed, the computing environment will have an updated master state and a sequential list of external actions. The updated master state and the sequential list of external actions can be used in conjunction with the input data that initiated the cycle of execution in verifying consensus amongst all involved parties. In other words, verifying consensus is preferably achieved against the tuple of input, updated master state, and external actions. Practical Byzantine Fault Tolerance (PBFT), Raft, Tendermint consensus, and/or other consensus algorithms or engines may be applied in establishing consensus.

5. Exemplary Execution Cycle

FIG. 4 demonstrates an exemplary cycle of execution of the system and method. Terms, fields, structures, and other incidents used in these examples are not intended to be exhaustive or limiting. Other data structures, fields, and approaches may be used without deviating from the scope and nature of the disclosed invention. In this example, the execution environment receives a StatementEval Input (I1) COG object as an input which comprises a COG value, a statement reference, and a scope field. The execution cycle may address processing of input, performing state transitions, performing external actions, recovering from errors, and handling other scenarios, as shown in FIG. 5.

A COG value or reference to a COG value can function to describe the reason for the input's existence. In this example it is labeled "<executionStart>" for brevity. This may be more descriptive, such as a reference to the data layer event that triggered the execution, in conjunction with some proof of temporal ordering of events. Other suitable approaches, data, and metadata may be used.

A reference to a Statement functions to identify a statement or elementary operation of the computing environment to be executed. A Statement should be contained within a function (a collection of statements which produce a desired result when ran in sequence), which is in turn contained within a programmable clause. A programmable clause preferably includes, but as stated is not limited to, a collection of related Functions which represent a desirable set of operations against a State). A Clause in some ways can characterize the programmatic representation of a clause or contract in the traditional legal sense such as in the data driven contracts described in U.S. patent application Ser. No. 15/476,791 incorporated above. The example of FIG. 4 explicitly refers to the first Statement in I1. An implementation of the computing environment could disallow StatementEval inputs that refer to any statement other than the first in a Function as the initial input. Alternatively, a FunctionCall input may be defined, which takes a reference to a Function and treated such that it implicitly refers to the target Function's first statement.

A scope field functions to influence the computing environment before the Statement is evaluated, representing assigned variables in the function body as it runs. The exemplary initial scope of FIG. 4 comprises of two fields, a state field and an input field. Additional and/or alternative fields may be used in other variations.

A state field can reference data that can be shared amongst Functions in a Clause. One implementation of the computing environment could ensure that clauses and states could not be mixed and matched. For example, a stateKind field within the state could refer to one or more clauses with which the state is compatible. In this example, the initial value is a reference to State S1, which was created in a previous run of the computing environment cycle.

An input field can function to reference some input data, which may be utilized by the function to influence its behavior. In one implementation, a check could be used to ensure that the correct kind of data is used as an input to the function and used in a suitable manner. This data may be a COG object representing input from the Data Layer and/or other sources.

These two fields may be seen as special variables, which may not be ideal for correctness in some scenarios. These two fields serve as one exemplary implementation and in no way is intended to limit the nature of the implementation. For example, another implementation may move these fields outside of "scope" and possibly into the body of the StatementEval itself.

Many objects in the FIG. 4 example contain a "createdBy" field, which reference some other object that led to their creation. This may be applied to ensure that one may always verify the integrity of the entire history of evaluation. This property can be preserved as the evaluation cycle runs in the computing environment. A "createdBy" field preferably includes the Merkle link of referenced objects, thereby creating a hash-linked directed acyclic graph of computational and contract state.

Through the evaluation cycle as shown in FIG. 4, one objective is to execute the logic of a Function (F1) within the context of a Clause (C1), using an existing State (S1) and some input Data (D1). In the description of this evaluation cycle, "modifying" of state is used to characterize the creation of new states with one or more values changed. In the implementation using a COG object with content addressed objects, the direct modification of a state object may not be technically feasible. Additionally, "side effects" as used in reference to the description of the evaluation cycle can refer to any non-pure/-total/-deterministic actions besides modification of state. Any suitable language may be used to express the statements in a function. The intent of Function F1 in this example is:

1. Increment the "value" field in the clause state by the value of the "value" field in the input Data. Then, also hold onto that result under the name "v" for use by later Statements. This implies that the expression "_state.value+=_input.value" both updates _state.value as a side effect, and returns the value it assigned to "_state.value". The "v<-" part implies that we wish to bind that result to a variable named v.
2. Send the value of the variable "v" to a BDL (the specifics of which are omitted for brevity). A robust VM implementation would naturally care about specifics such as what "v" actually is (an address, an amount, etc.) and necessitate more than one parameter to the operation.

The exemplary evaluation cycle demonstrated in FIG. 4 may occur as follows:

1. Ensure that the input is a sensible COG object given any robustness requirements. (For instance, if this is the first run start of the cycle, assert that the statement to evaluate is the first one in the function).
2. Create a new State (S1'), identical to S1, except its "createdBy" field refers to I1. Even if the statement does not modify the state (even though our example does), a new State may be created in order to maintain the historical integrity property. S1' is not shown in the FIG. 4 because after the next step, S1' is discarded and its existence is irrelevant after the logic inside the first statement is evaluated.
3. Perform the logic expressed in the statement. In our case the first statement:
   a. Updates the "value" field in the state. In one implementation, the modification may be creating a new State, one that can be referred to as S2.
   b. Returns the new value that is now set in the S2 object (R1).
4. Had step 3 not modified S1', S1' could have been referred to as S2. In the example of FIG. 4, the "prime" in the name is to suggest that it's an ephemeral intermediary state, which is not known to be relevant until after the statement, evaluates.
5. Because another statement awaits execution in the function, another StatementEval object can be created. This StatementEval object is similar to the initiating one, except "_state" is now set to S2, and there now exists a new variable in the "scope", called "v". V is a reference to the COG object created from 3b (containing the value returned by the expression). Because the expression in the first statement had no side effects besides modifying the State, external actions are not queued. Furthermore, the "statement" to evaluate is now the next statement in the function. The new StatementEval (I2) can be fed back into Step 1. The second and final statement ends up creating another State S3 (which, even though the contents are not modified, needs to exist for the historical integrity trace), a new return value R2 (representing the hash of the transaction to send to the BDL, potentially for use by further statements had they existed), and a BDLSend B1 which represents the intent to perform an operation on a BDL.

Had there been no further statements to execute, the new state and return value would not be wrapped in a StatementEval object, and instead the process would return S2 and R1 (and any queued external actions) to whomever started the evaluation process. This process variation is shown as what happens after the second cycle, when S3, R2, and B1 are returned.

The primitive statements that may be utilized by the VM must act in a deterministic manner when used in such a system. The statements include:

1. Rudimentary arithmetic operations (including but not limited to: addition, subtraction, multiplication, division, modulo). Such operations take one or more parameters and return a value consisting of the result and no side effects.
2. State-modifying operations (including but not limited to: +=, -=, *=, /=, %=), which have no side effects but do modify the State
3. External actions such as BDL writes which may or may not affect the state, may or may not have a return value, and may or may not produce an additional output representing the intent to perform a side-effectful operation.
4. And other suitable deterministic operations Consensus As discussed above, the system and method may be combined with a consensus mechanism to ensure that all parties to the contract evaluate the logic consistently, and ensure idempotence of external actions/side effects. Note that several paths may lead to a consensus failure. A prudent developer of logics for the computing environment should be aware of the potential failure modes and structure their external systems and methods accordingly. Appropriate logic and system precautions are preferably made to counteract such potential failure modes.

An exemplary process may behave as follows:

1) A party proposes a StatementEval object given some data, a clause, and the last known State for that clause—and the resulting objects from evaluating that StatementEval input.
2) Other peers (e.g., contracting parties) evaluate the proposed StatementEval object, and ensure that they get the same result. These peers may also verify the validity and integrity of the data submitted, whether or not the StatementEval actually operates against the latest State for the Clause as far as they're aware, etc. If any of these invariants don't hold, the proposal is ignored and discarded.
3) If all parties end up at the same set of output objects, they then look at the queued side effects. For each side effect in the order it was created, they determine which peer is best suited to perform the operation, and have that peer perform it. If no peers are suited to performing the action, or the peer irrecoverably fails at performing it, the consensus process is aborted and the proposal is discarded.

4) If all of the above succeeds, all peers record the proposed output State as the "latest" state for the Clause operated against, for use in further rounds of the consensus process.

Higher-Level Constructs

Using the relatively basic constructs described earlier, an implementer of the system and method may opt to enhance it with various features to streamline the architecture and development cycle of their Clauses and contracts.

As discussed above, a potential implementation of the system and method may make use of the constructs of a master clause and Master State. Much like with "state" and "_input", master clauses and Master States may have a marginal amount of special treatment in the VM architecture. A Master State is a State that consists of a mapping of (child) Clauses to States, and generalizes the State consensus described in the Consensus section to multiple related Clauses. The Master State also contains various parameters to lower level operations such as BDL reads/writes which would otherwise have to be tracked and supplied by the developer(s) of Clauses, and a sufficiently sophisticated VM may opt to supply these parameters automatically by reading them from the Master State being operated against.

A master clause is similarly a Clause which intelligently handles arbitrary inputs and routes them to appropriate clauses with States, as well as updates the Master State accordingly to track the parameters to low-level external operations as new events come in from the computation layer. For example, the data layer may send an input saying that a BDL has a new canonical chain head, and the master clause would update its Master State to reflect that fact for subsequent BDL operations, as well as invoke one or more Clauses that are interested in such events. A VM implementation may have support for special inputs/statements to allow recursively invoking itself with calls to/from the master clause, with sub-clauses States transparently being tracked in the Master State, enabling a method of communication between the Clauses while still maintaining the relative simplicity of the Consensus process. As an analogy to current computing models, the VM is the CPU, the master clause/State is the Operating System, the Clauses are the Processes managed by the Operating System. Any necessary extensions to the VM to support this seamlessly may be analogous to specialized instructions currently implemented in many CPUs that improve overall performance by optimizing common routines utilized by Operating Systems as part of their functionality.

The statements that comprise a master clause may either be manually specified (analogous to functions provided by a BIOS etc.) or included as part of a VM implementation (analogous to CPU microcode or firmware). Such code should ideally have sufficient functionality to perform the operations described earlier. Such code may also implement an Event Dispatch Matrix.

In doing so, sophisticated compositions of simpler Clauses may be rapidly created in a matter not significantly different from current software development practices. Furthermore, composition of simpler logical units lends itself particularly well to graphical programming techniques such as a drag-and-drop style input/output mappings.

An example of a mechanism for routing Data Layer inputs to Clauses is what we refer to as an Event Dispatch Matrix.

A master clause may contain logic to introspect the contents of input data being fed to it, and route it to one or more Clauses that it manages based on criteria such as a rules engine, configuration that is specified when the Clause/State are instantiated, or other configuration based on previous inputs supplied to it. If a master clause is implemented with functionality to allow inter-Clause communication, then a similar mechanism may be used by Clauses to subscribe and unsubscribe from incoming events as the contract is executed.

The system and method may interface with a BDL in a variety of ways. In a preferred embodiment, a contract containing one or more programmable clauses is executed off-chain and outputs are instantiated on-chain. Such outputs include executing transactions on-chain, which may include performing transfers of digital assets between BDL accounts, instantiating transaction objects on-chain (which may include, but is not limited to, contract and/or clause state; outputs from clauses, etc.) as distributed records. FIG. 6 provides a depiction of an exemplary embodiment of an interface between the 'off-chain' runtime of the system and method and a blockchain/distributed ledger runtime and system.

A BDL system may be an account-based BDL system, Unspent Transaction Output-based (UTXO) system, or any other form of BDL, distributed database or similar. Multiple BDL systems may be used with an off-chain contract. In one implementation, the system and method may form part of a wider system that includes one or more BDL systems. FIG. 14 and FIG. 15 depict the system and method as an exemplary part of a data-driven contract management system. An outbound adapter may provide an interface to one or more BDL systems.

In a preferred embodiment, the system and method preferably forms a component in a larger architecture. This may include a contract management system as depicted in FIG. 15. A contract management system of a preferred embodiment preferably provides a contract editor interface 101, a repository system 102 for storing contract templates (e.g. data models, contract logic, natural language text, etc.), resource interfaces 103 to enable the Execution Engine 104 to receive and send data to and from integrated resources such as web service or other APIs, edge computing devices, blockchain and distributed ledger-based systems, and other suitable resources external to a contract 105. Such external resources may be integrated with the system and method and, where applicable, a contract management system as depicted in FIG. 14. Other approaches to integrating external resources with the system and method may be used. Extending the system and method to a BDL system may take a form substantially similar to that depicted in FIG. 18. Alternative and/or supplementary approaches to utilizing a BDL may also be used.

FIG. 18 provides an exemplary interface between a BDL system and the system and method deployed in an off-chain execution environment. A BDL system may be an account-based BDL system, Unspent Transaction Output-based system, or any other form of BDL, database or similar. Multiple BDL systems may be used with an off-chain contract. 'Call' (i.e. calling functions in on-chain code) and 'Create' are examples of on-chain operations that may be performed (e.g. via API) 101. Additional and/or alternative operations may be performed to enable any necessary operation to be performed 'on-chain'. Parameters and other data may be passed to on-chain code from the off-chain contract execution 102 to perform the on-chain computation/transaction. For example, on-chain code may be instantiated upon execution/signature of the off-chain contract (e.g. by compilation or cross-compilation—103) or on-chain code may be an on-chain library of standardized operations, transactions, events etc. This script/on-chain code may later be called by the system. The transaction may be signed by the private key(s) of public-private key pair for a contracting party 104. In one embodiment, management of keys may be delegated to a key management module 105. The module may, in one embodiment, be an external service or resource or series or services/resources. Private keys may be generated per contract for each contracting party, or maybe keys that are pre-existing (e.g., from an external service or held by the system). A contracting party may initiate the signing of a transaction, or signing may be delegated to the key management module or other service. The signed transaction/operation is then sent to a local node 106 (any appropriate approach of doing so may be used, e.g. RPC). The local node may validate the transaction/operation for the BDL network. The transaction/operation is then propagated to the BDL network 107, executed by the runtime of the BDL system (e.g., a container transaction processor, virtual machine, or similar), and may be finalized as a confirmed transaction within the BDL data structure 108. A module may be used to listen for 'on-chain' operations, events, transactions, etc. 109. Data from the listener may be passed to the execution engine to update the state of the contract when a transaction is confirmed and updated in the object graph 110.

FIG. 18 is not intended to be limiting or exhaustive. Additional or alternative components, and interactions between components may be used. Additional and/or alternative steps may be used. Not all components depicted may be used in an implementation. The system and method may also consume BDL transaction data as inputs through the data layer. Such inputs may include, but are not limited to, digital asset transactions, as exemplified above, but also data recordation on a BDL (e.g., IoT sensor readings, data from web services via API, etc.). FIG. 17 depicts an exemplary record of an IoT sensor reading stored on a BDL for use by a data-driven legal contract. Data recorded on a BDL may be used as data inputs to the contract runtime through the data layer.

6. End-to-End Example

Figure 8:
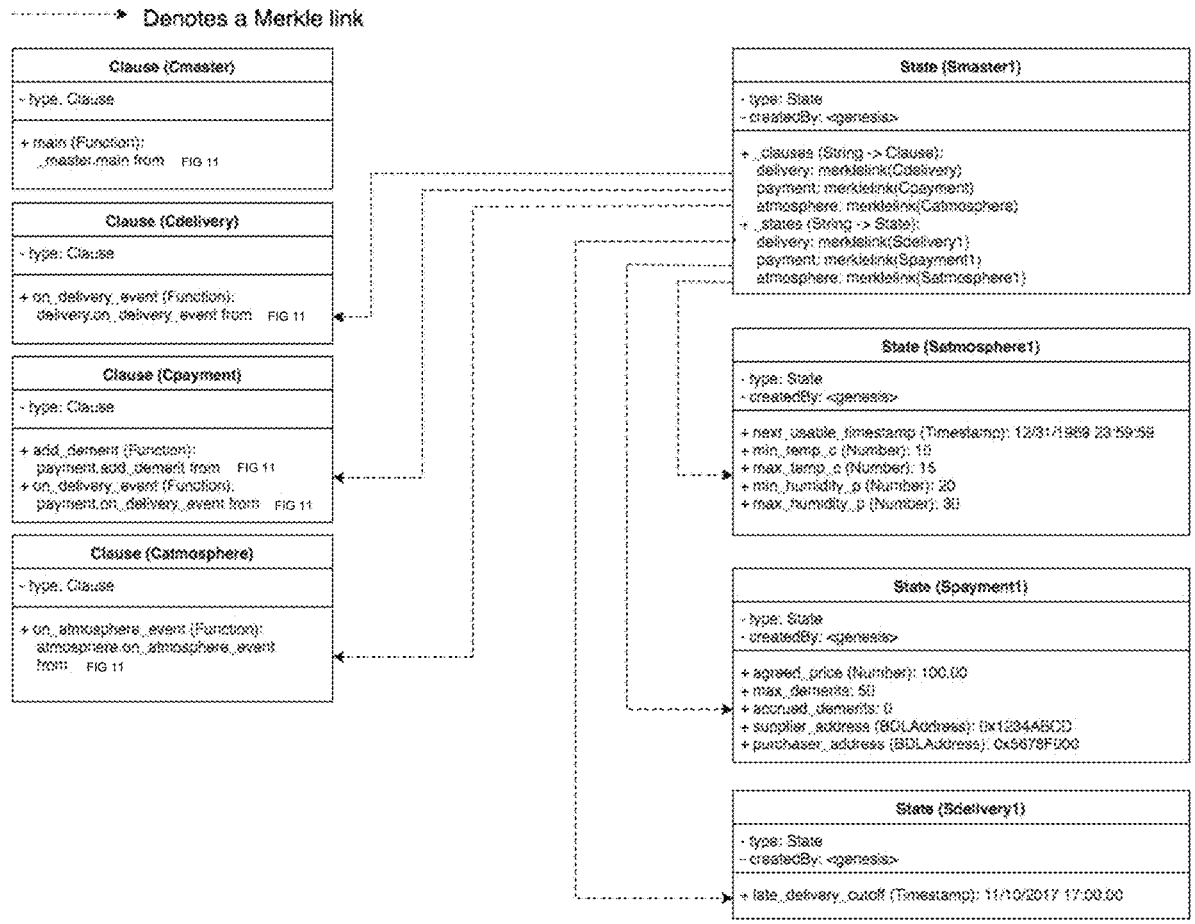
FIG. 8 is a schematic representation of a initial state of an exemplary contract to be executed as COG objects.
Figure 9A:
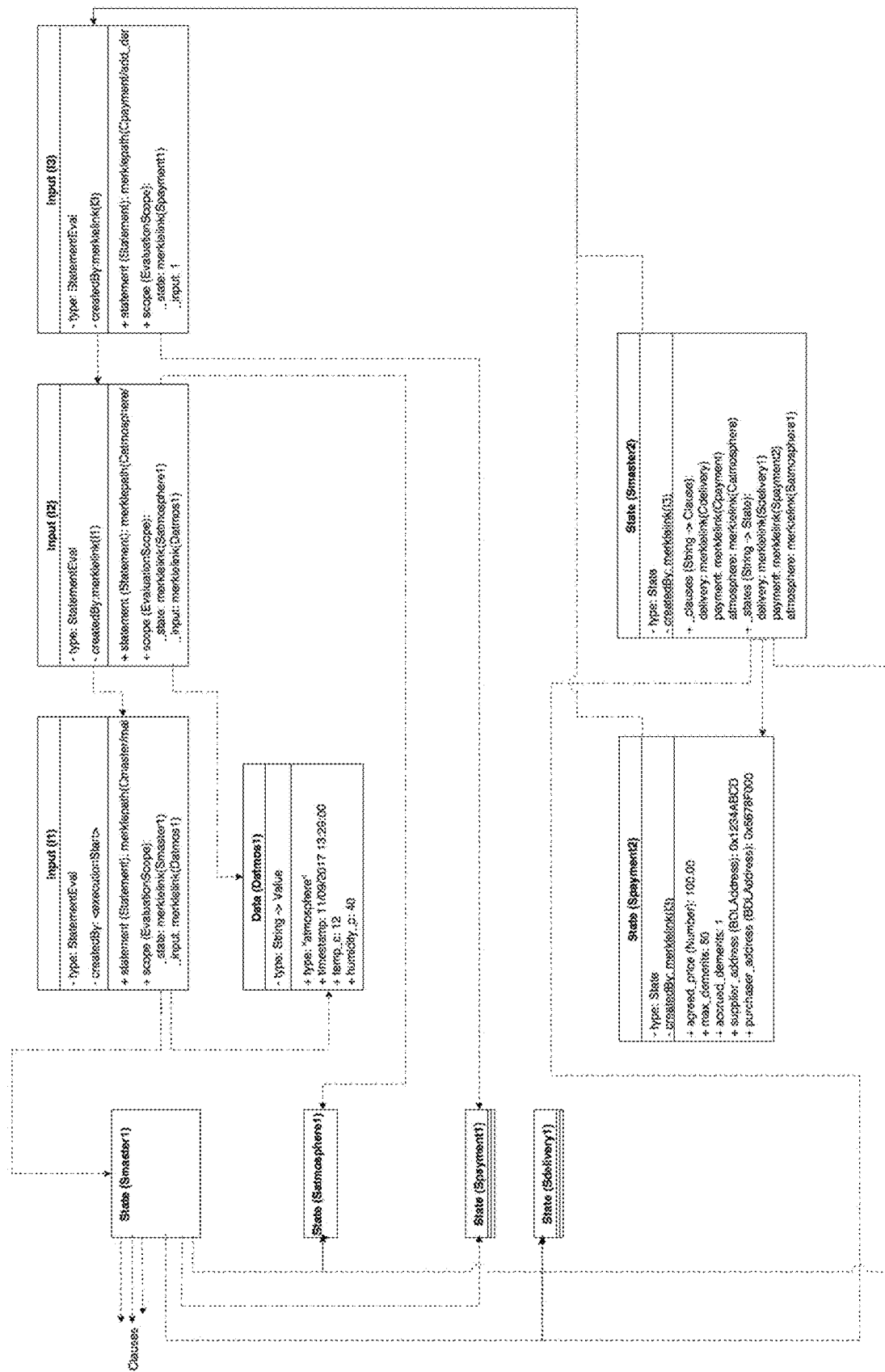
FIGS. 9A and 9B represent the exemplary generation of new states as data input events relevant to a contract and execution of the contract against the data inputs.
Figure 9B:
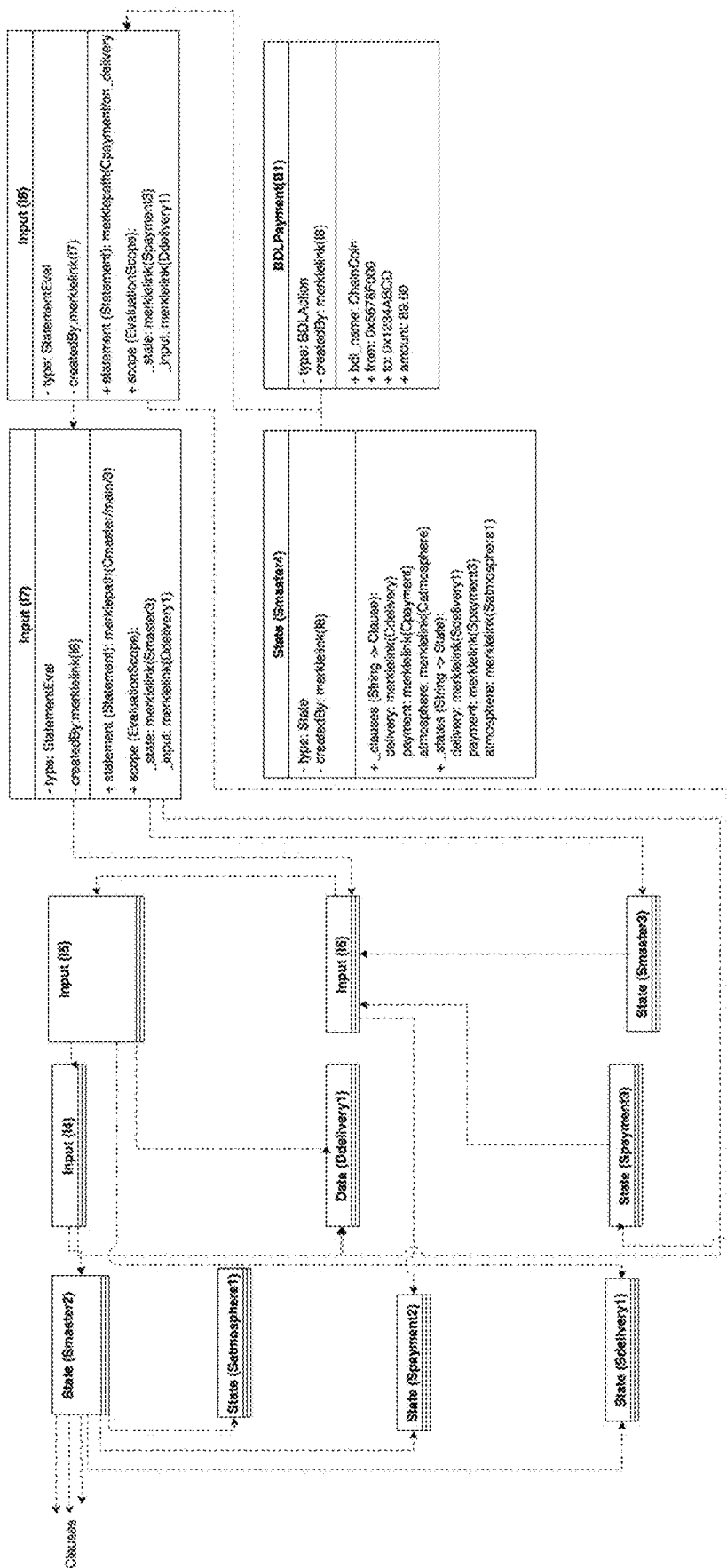

FIGS. 8, 9A, and 9B depict various stages of an exemplary abstraction of an execution cycle of the system and method for an exemplary supply contract logic depicted in FIG. 7. The following is intentionally abstract to demonstrate concepts and, as such, is an exemplary, high-level, non-limiting, and non-exhaustive representation of one approach to the process of executing a contract using the system and method. It is not intended to depict the only manner and usage of the system and method. Other approaches, modifications, and workflows may be used with the system and method. For example, a master state of a contract may not be used and instead each clause may simply be referenced by its own state reference, by a concatenated reference of the object references of all programmable clause states, or some other mechanism. Furthermore, different approaches to constructing a data-driven contract may be used, such as that depicted in FIGS. 12, 17, and 19, utilizing natural language, data models, and a request/response paradigm. This example may be adapted to account for such variations.

FIG. 8 depicts an exemplary genesis state of the clauses and master state as follows:

Delivery Date: Delivery should be by X date. If not delivered by X date, ten demerits (an abstraction for a reduction in a value) shall be accrued for the purposes of adjusting the final price payable. Parameterized as: Nov. 10, 2017 at 5 PM ("late_delivery_cutoff").

Shipping Conditions: The shipment shall be kept in the following atmospheric conditions during transport: (i) ambient temperature between A and B degrees celsius, inclusive; and (ii) humidity between C and D %, exclusive. For each reading outside of the conditions outlined in (ii), one demerit shall be accrued for the purposes of adjusting the final price. Parameterized as: 10 and 15 degrees celsius ("min_temp_c" and "max_temp_c" respectively), and humidity between 20%-30% ("min_humidity_p" and "max_humidity_p" respectively).

Payment: Purchaser is to pay price P to the supplier upon delivery using the 'CoinChain' BDL, less 1% of P for each demerit accrued, with a maximum of S demerits. Supplier's address on the 'CoinChain' BDL is Q. Purchaser's address on the 'CoinChain' BDL is R. Parameterized as: $100 ("agreed_price"), supplier's address Q is 0x1234ABCD ("supplier_address"), and purchaser's address R is 0x5678F000 ("purchaser_address").

The example depicts evaluation of two events related to the contract: one "atmospheric condition" event and one "delivery" event. The atmospheric conditions will report a humidity of 40% (outside the acceptable range) and accrue one demerit, and a late delivery on Nov. 12, 2017, accruing ten demerits. These events shall occur in the same temporal ordering.

As shown in FIG. 9A, for the first event, an input (I1) is constructed containing the atmospheric data (Datmos1) and a reference to the last master state, Smaster1 (i.e., that generated from contract formation). Evaluating the logic in the master state and atmosphere input data leads to a series of inputs (I2 and I3) being generated, each representing a call into another clause. Ultimately, this leads to a new State for the payment being created (Spayment2) and a new master state (Smaster2), which tracks Spayment2 as the latest state for the payment clause. For the next event, Smaster2 shall be used as the master state. The contracting parties may perform a consensus cycle, and agree on Smaster2 being the latest state before proceeding to subsequent events.

FIG. 9B depicts the state of the execution cycle upon the second delivery event. The event timestamp (Nov. 12, 2017) dictates that a late delivery penalty is to be applied. An input (I4) is constructed calling the master clause with the event and the last master state (Smaster2). As the master clause evaluates its logic, first it performs a call to delivery_clause.on_delivery_event (I5), which in turn calls payment_clause.add_demerits (I6). This leads to a new payment state (Spayment3) and thus a new master state (Smaster3). The new master state calls (I7) the payment clause on_delivery_event (I8), with the payment clause state (Spayment3). The payment clause creates a BDL Payment action (B1), and execution finishes afterwards, creating a new master state that is identical to Smaster3. However the createdBy field is changed to a merkle-link to I8 to reflect that it is the final state after the entire chain of evaluations (Smaster4). The parties may run the consensus cycle once again to agree that Smaster4 and B1 (or the content-addressed hashes thereof) are the expected outputs of computation.

Figure 10:
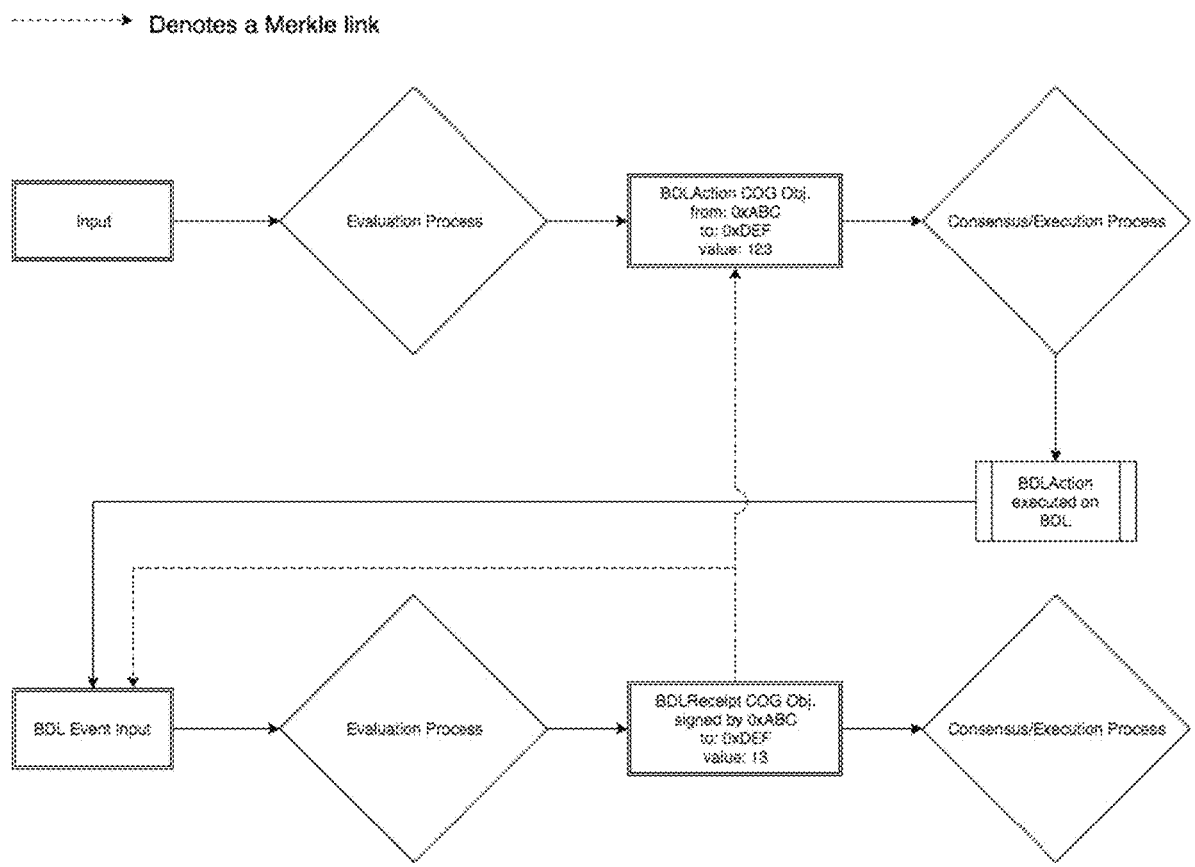
FIG. 10 demonstrates a high-level exemplary process for validating Blockchain/Distributed Ledger (BDL) transaction execution inside the system.

Subsequently, as part of the execution cycle, the parties may determine who is responsible to perform the external action (i.e. the BDL transaction). Preferably, a BDL transaction is executed using a mechanism similar to FIG. 18; where the system and method is implemented as part of, or in conjunction with, a contract management system (see FIG. 14 and FIG. 15). A user interface of the CMS may be configured to provide notifications to the user of the CMS to perform or approve such actions. In one variation, these external actions may be 'queued up' in a task manager, requiring a user of the CMS to authorize their execution. For example, a BDL transaction may be configured for execution as a result of a contracting party receiving the external action event (e.g. B1) and displayed to the user for authorization to complete (e.g. by signing the proposed BDL transaction with the user's private key as depicted in FIG. 18). In one exemplary implementation, a listener (see FIG. 18) may be used to provide a further input to the execution engine. FIG. 10 demonstrates a high-level exemplary process for validating BDL transaction execution inside the computing environment. In such a scheme, a BDL transaction gets executed during the consensus/execution cycle. It also tracks the pertinent details of such a transaction and waits for BDL events to see if and when the previously issued transaction is actually executed on the target BDL. Afterwards, a contract may generate a "receipt" COG object, thereby confirming amongst the parties that the BDL transaction external action has occurred on a BDL. The contract may also create another BDL transaction that simply creates a record of confirmation of the previous one and references the aforementioned object, if necessary. Alternatively, the data relating to the BDL transaction (e.g. transaction hash, timestamp, confirmations, and other metadata) may be returned to the user(s) via the CMS interface.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
accessing, by a computing system bridging an off-chain execution environment and a file system, an electronic document, wherein the electronic document comprises natural language content and a plurality of programmable clauses executed at the off-chain execution environment, wherein a programmable clause of the plurality of programmable clauses comprises computer executable instructions that define:
a clause state object that indicates an execution state of the programmable clause;
computing, by the computing system, a Merkel directed acyclic graph (MDAG) data structure of the electronic document, wherein at least a subset of objects in the MDAG data structure correspond to the clause state object of the programmable clause of the electronic document;
receiving, by the computing system via an application programmable interface in communication with the off-chain execution environment and the file system, a contract input including a hash link reference to a current state object corresponding at least to the subset of objects in the MDAG data structure, the current state object indicating a current execution state of the programmable clause;
responsive to receiving the contract input, processing the contract input according to logic of a root state object associated with the MDAG data structure configured to cause the computing system to:
generate, based on the contract input and the current state object, an updated state object indicating an updated execution state;
modify the MDAG data structure by appending, using hash-linking, at least the subset of objects in the MDAG data structure to include the generated updated state object, the MDAG data structure including a prior version of the generated updated state object;
store, via a peer-to-peer system of the file system, at least the subset of objects of the MDAG data structure to verify the programmable clause; and
dispatch execution to other clause logic object referenced in the MDAG data structure.

2. The method of claim 1, wherein processing the contract input further comprises:
generating at least one output object,
verifying, via the peer-to-peer system of the file system, consensus based at least on the MDAG data structure, and
in response to a verifying consensus, performing actions of the at least one output object.

3. The method of claim 2, wherein performing the actions comprises:
detecting one or more external actions to process in response to the at least one output object;
responsive to detecting the one or more external actions, selecting a peer to perform the action; and
directing the selected peer to attempt the one or more external actions, wherein generating the at least one output object comprises recording an output state upon success of the one or more external actions.

4. The method of claim 1, wherein the computing system is a contract management system.

5. The method of claim 1, further comprising generating at least one output object in response to the contract input.

6. The method of claim 5, further comprising performing an external action in response to the at least one output object in the MDAG.

7. The method of claim 5, further comprising invoking at least one additional clause logic object in response to the output object.

8. The method of claim 5, wherein generating the at least one output object further comprises generating a return object to be returned to an original invoking clause logic object.

9. The method of claim 6, further comprising performing an action comprising interfacing with and executing a transaction with a distributed ledger system.

10. The method of claim 6, further comprising performing an action comprising communicating with an edge computing device.

11. The method of claim 6, further comprising performing an action comprising communicating with an external application programming interface.

12. The method of claim 9, wherein interfacing with and executing the transaction with the distributed ledger system comprises storing object data on a distributed ledger.

13. The method of claim 1, wherein the MDAG comprises of objects associated with clause logic of at least one programmable clause of the electronic document and data objects.

14. The method of claim 1, further comprising performing the method in a virtual machine computing environment.

15. The method of claim 14, wherein the virtual machine is run on a plurality of computing hosts within a peer-to-peer network.

16. The method of claim 1, wherein the contract input originates from one of the following: an edge computing device, a distributed ledger system, a blockchain system, or data retrieved through the application programming interface.

17. The method of claim 1, wherein the electronic document is a legal contract between at least two parties.

18. A computer program product comprising a non-transitory computer readable storage media having instructions encoded thereon that, when executed by a computing system, cause the computing system to:

access, by an interface bridging an off-chain execution environment and a file system, an electronic document, wherein the electronic document comprises natural language content and a plurality of programmable clauses executed at the off-chain execution environment, wherein a programmable clause of the plurality of programmable clauses comprises computer executable instructions that define:
    a clause state object that indicates an execution state of the programmable clause;

compute a Merkel directed acyclic graph (MDAG) data structure of the electronic document, wherein at least a subset of objects in the MDAG data structure correspond to the clause state object of the programmable clause of the electronic contract document;

receive, via an application programmable interface in communication with the off-chain execution environment and the file system, a contract input including a hash link reference to a current state object corresponding at least to the subset of objects in the MDAG data structure, the current state object indicating a current execution state of the programmable clause;

responsive to receiving the contract input, process the contract input according to logic of a root state object associated with the MDAG data structure configured to cause the computing system to:
    generate, based on the contract input and the current state object, an updated state object indicating an updated execution state;
    modify the MDAG data structure by appending, using hash-linking, at least the subset of objects in the MDAG data structure to include the generated updated state object, the MDAG data structure including a prior version of the generated updated state object;

store, via a peer-to-peer system of the file system, at least the subset of objects of the MDAG data structure to verify the programmable clause; and dispatch execution to other clause logic object referenced in the MDAG data structure.

19. A computer system comprising:

one or more processors;

an interface; and a non-transitory computer readable storage media having instructions encoded thereon that, when executed by the one or more processors, cause the one or more processors to:

access, by an interface bridging an off-chain execution environment and a file system, an electronic document, wherein the electronic document comprises natural language content and a plurality of programmable clauses executed at the off-chain execution environment, wherein a programmable clause of the plurality of programmable clauses comprises computer executable instructions that define:
    a clause state object that indicates an execution state of the programmable clause;

compute a Merkel directed acyclic graph (MDAG) data structure of the electronic document, wherein at least a subset of objects in the MDAG data structure correspond to the clause state object of the programmable clause of the electronic document;

receive, via an application programmable interface in communication with the off-chain execution environment and the file system, a contract input including a hash link reference to a current state object corresponding at least to the subset of objects in the MDAG data structure, the current state object indicating a current execution state of the programmable clause;

responsive to receiving the contract input, process the contract input according to logic of a root state object associated with the MDAG data structure configured to cause the computing system to:
    generate, based on the contract input and the current state object, an updated state object indicating an updated execution state;
    modify the MDAG data structure by appending, using hash-linking, at least the subset of objects in the MDAG data structure to include the generated updated state object, the MDAG data structure including a prior version of the generated updated state object;

store, via a peer-to-peer system of the file system, at least the subset of objects of the MDAG data structure to verify the programmable clause; and dispatch execution to other clause logic object referenced in the MDAG data structure.

* * * * *